US008718444B2

(12) United States Patent
Miura et al.

(10) Patent No.: US 8,718,444 B2
(45) Date of Patent: May 6, 2014

(54) VIDEO SEARCH DEVICE, VIDEO SEARCH METHOD, RECORDING MEDIUM, PROGRAM, AND INTEGRATED CIRCUIT

(75) Inventors: Kouji Miura, Osaka (JP); Masaya Yamamoto, Kanagawa (JP); Shingo Miyamoto, Hyogo (JP)

(73) Assignee: Panasonic Corporation, Osaka (JP)

( * ) Notice: Subject to any disclaimer, the term of this patent is extended or adjusted under 35 U.S.C. 154(b) by 96 days.

(21) Appl. No.: 13/389,144

(22) PCT Filed: Mar. 17, 2011

(86) PCT No.: PCT/JP2011/001596
§ 371 (c)(1),
(2), (4) Date: Feb. 6, 2012

(87) PCT Pub. No.: WO2011/158406
PCT Pub. Date: Dec. 22, 2011

(65) Prior Publication Data
US 2012/0134648 A1 May 31, 2012

(30) Foreign Application Priority Data
Jun. 16, 2010 (JP) ................................ 2010-137072

(51) Int. Cl.
*H04N 5/92* (2006.01)
(52) U.S. Cl.
USPC .......................................... 386/248; 386/282
(58) Field of Classification Search
None
See application file for complete search history.

(56) References Cited

U.S. PATENT DOCUMENTS

| 6,195,497 | B1 | 2/2001 | Nagasaka et al. |
| 7,206,779 | B2 | 4/2007 | Furuhashi et al. |
| 2002/0191016 | A1 | 12/2002 | Furuhashi et al. |
| 2003/0084064 | A1 | 5/2003 | Furuhashi et al. |
| 2004/0064526 | A1* | 4/2004 | Lee et al. ...................... 709/217 |
| 2006/0012830 | A1* | 1/2006 | Aiso ........................... 358/3.27 |
| 2008/0086688 | A1* | 4/2008 | Chandratillake et al. ..... 715/719 |
| 2009/0310930 | A1* | 12/2009 | Morimoto et al. ............... 386/52 |
| 2009/0322934 | A1* | 12/2009 | Ishii ............................... 348/345 |
| 2010/0166390 | A1* | 7/2010 | Fukuya et al. .................. 386/95 |

FOREIGN PATENT DOCUMENTS

| JP | 6-89545 | 3/1994 |
| JP | 2002-373177 | 12/2002 |
| JP | 2003-141161 | 5/2003 |
| JP | 2004-127311 | 4/2004 |
| JP | 2005-63465 | 3/2005 |
| JP | 2005-107767 | 4/2005 |
| JP | 2005-197987 | 7/2005 |
| JP | 2009-232250 | 10/2009 |
| JP | 2009-296346 | 12/2009 |

OTHER PUBLICATIONS

International Search Report issued Apr. 12, 2011 in International (PCT) Application No. PCT/JP2011/001596.

* cited by examiner

*Primary Examiner* — William C Vaughn, Jr.
*Assistant Examiner* — Eileen Adams
(74) *Attorney, Agent, or Firm* — Wenderoth, Lind & Ponack, L.L.P.

(57) ABSTRACT

A video search device extracts a plurality of objects each contained in a different one of frames of a video, assigns a weight value to each of the extracted objects based on a time-series feature of the frame containing the object, and searches for an object similar to each of the extracted objects based on the extracted objects each having the weight value assigned thereto.

15 Claims, 35 Drawing Sheets

FIG.4A
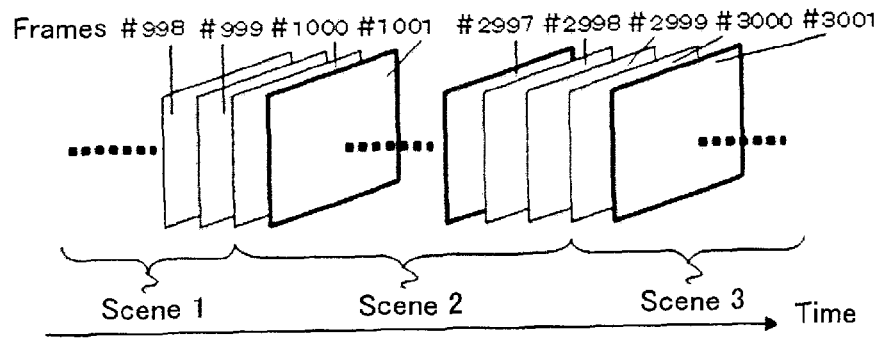
FIG.4B
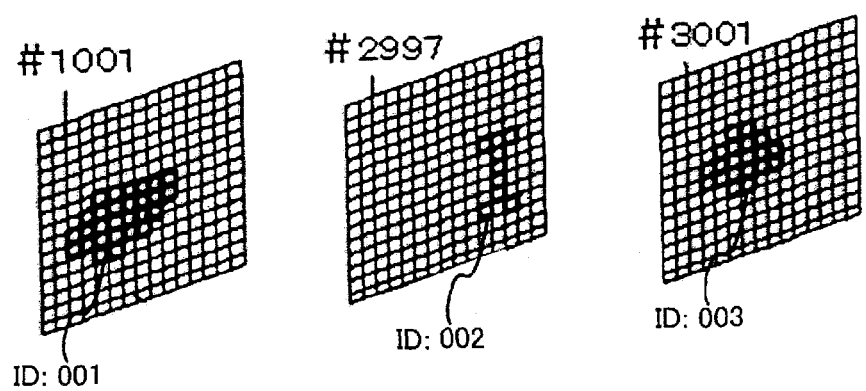
FIG.4C
| Object ID | Frame number | Scene number |
|---|---|---|
| 001 | #1001 | 2 |
| 002 | #2997 | 2 |
| 003 | #3001 | 3 |

FIG.6

Feature information of object
having object ID: 0001

| i | j | R | G | B |
|---|---|---|---|---|
| 2 | 4 | 30 | 10 | 10 |
| 2 | 5 | 40 | 10 | 8 |
| 3 | 4 | 35 | 8 | 10 |
| 3 | 5 | 35 | 10 | 8 |
| . | ... | ... | ... | ... |

| 0001 | #1234 | ABC |

| i | j | R | G | B |
|---|---|---|---|---|
| 2 | 6 | 254 | 253 | 0 |
| 2 | 7 | 254 | 252 | 0 |
| 3 | 5 | 253 | 253 | 5 |
| 3 | 6 | 254 | 252 | 240 |
| . | ... | ... | ... | ... |

| xx | #100 | ABC |

FIG.12
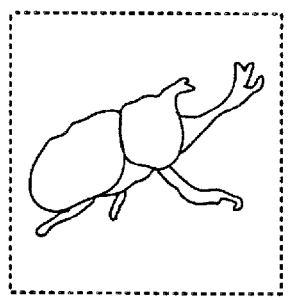
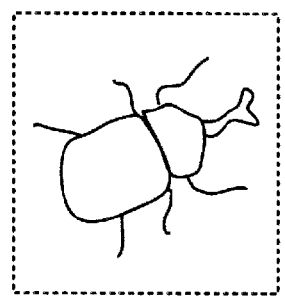
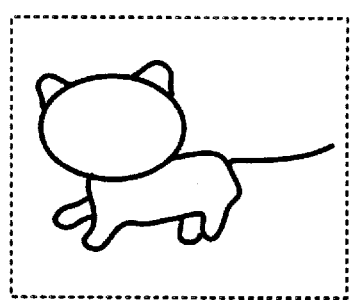
Object ID: 011
Frame ID: #2000
Object ID: 012
Frame ID: #2500
Object ID: 013
Frame ID: #3500

FIG.13A

Object ID　Weight value

| 011 | 0.5 |
|-----|-----|
| 012 | 0.5 |
| 013 | 0.5 |

FIG.13B

Object ID　Weight value

| 011 | 0.5 | +0.3 → | 011 | 0.8 |
| 012 | 0.5 | +0.3 → | 012 | 0.8 |
| 013 | 0.5 | ------→ | 013 | 0.5 |

Example of primary similarity

FIG.23

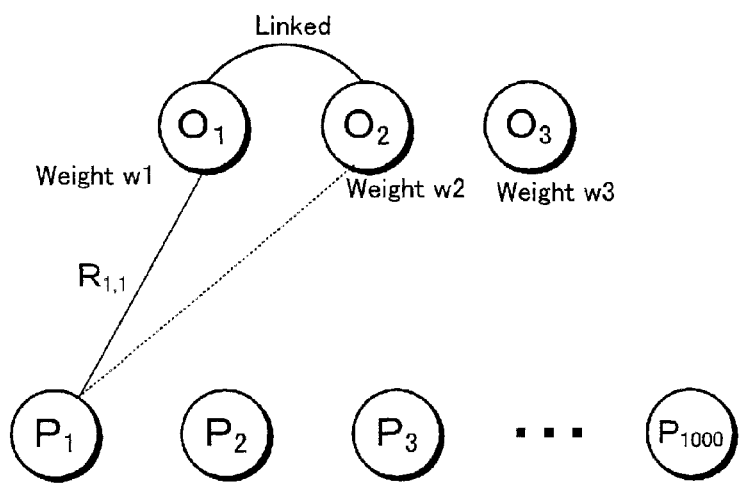

$$S_{1,1} = \underbrace{R_{1,1} \times w1}_{} + \underbrace{R_{2,1} \times w2}_{} \cdots \text{(Equation 1)}$$

Product of primary similarity between object used for search and target object multiplied by weight value of object used for search Product of primary similarity between each linked object of object used for search and target object multiplied by weight value of respective linked object $S_{h,i} = R_{h,i} \times wh + R_{h(1),i} \times wh(1) + R_{h(2),i} \times wh(2) + \cdots + R_{h(j),i} \times wh(j)$ ⋯ (Equation 2)

O=<(x1,y1),(x2,y2),...,(xn,yn),(x1,y1)>

VIDEO SEARCH DEVICE, VIDEO SEARCH METHOD, RECORDING MEDIUM, PROGRAM, AND INTEGRATED CIRCUIT

TECHNICAL FIELD

The present invention relates to an art of searching, based on an object appearing in a video, for an object, a video, and so on that are related to the appearing object.

BACKGROUND ART

With the recent increase in number of broadcasting channels, launch of video distribution services for TVs, and so on, digital video recorders have increased in accumulation capacity.

Also, there has been provided a service of video accumulation and viewing by providing an accumulation device for accumulating enormous amounts of videos on a server on a network. With this, a search device of efficiently selecting a desired video among enormous amounts of videos accumulated in the accumulation device.

According to Patent Literature 1, designation of an object (person) contained in a certain one frame contained in a video scene is received from a user, and a feature value of the designated object is extracted. Then, comparison is made with use of the extracted feature value, thereby to display another video scene in which the designated object appears.

CITATION LIST

Patent Literature

[Patent Literature 1] Japanese Patent No. 3711993
[Patent Literature 2] Japanese Patent Application Publication No. 6-89545

Non-Patent Literature

[Non-Patent Literature 1] Canny, J., "A Computational Approach to Edge Detection", IEEE Trans Pattern Analysis and Machine Intelligence, 8:679-714 (1986)
[Non-Patent Literature 2] Omachi, et al. "Fast Template Matching of Designated Regions Based on Polynomial Approximation", The Journal of the Institute of Image Electronics Engineers of Japan, vol. 38, no. 5, 648-655 (2009)

SUMMARY OF INVENTION

Technical Problem

However, the above described conventional art has a possibility that a user's desired video cannot be obtained. This is because not so high search accuracy is obtained from use of one designated object contained in a certain one frame for search for a video that is related to the one designated object.

For example, in the case where color combination of each object is used as a feature value of the object, an object might be searched for, which happens to be similar just in color combination to the one designated object but differs in substance from the one designated object.

The present invention is made under such a background, and aims to provide a video search device capable of contributing the improvement of search accuracy.

Solution to Problem

The video search device relating to the present invention is a video search device comprising: a playback unit operable to play back a content composed of a plurality of frames; a reception unit operable to, while the playback unit plays back the content, receive, from a user, a plurality of inputs each specifying an object contained in a different one of the frames of the content; a detection unit operable to, each time the reception unit receives an input, detect an object specified by the received input; an assignment unit operable to assign, to each of the objects detected by the detection unit, a weight value adjusted based on a time-series feature of the frame containing the object; and a search unit operable to perform search based on the objects each having the weighted value assigned thereto.

Advantageous Effects of Invention

With this structure, to each of a plurality of objects, a weight value is assigned, which is adjusted based on a time-series feature of a frame containing the object in a content. Then, search is performed based on the assigned weight values. This contributes to the improvement of search accuracy.

BRIEF DESCRIPTION OF DRAWINGS

FIG. 4A-FIG. 4C show a flow of specifying a scene to which an object belongs.
FIG. 6 shows an example of feature information stored in an object information storage unit 106.
FIG. 10 shows an example of feature information.
FIG. 12 schematically shows the information stored in the first buffer 110.
FIG. 13A shows the concept of assignment of an initial weight value,
and
FIG. 13B shows the concept of increment of a weight value.
FIG. 23 describes a method of calculating a secondary similarity between the object $O_1$ and an object $P_1$.

DESCRIPTION OF EMBODIMENT

The following describes an embodiment of the present invention with reference to the drawings.

Embodiment

<Structure>

Figure 1:
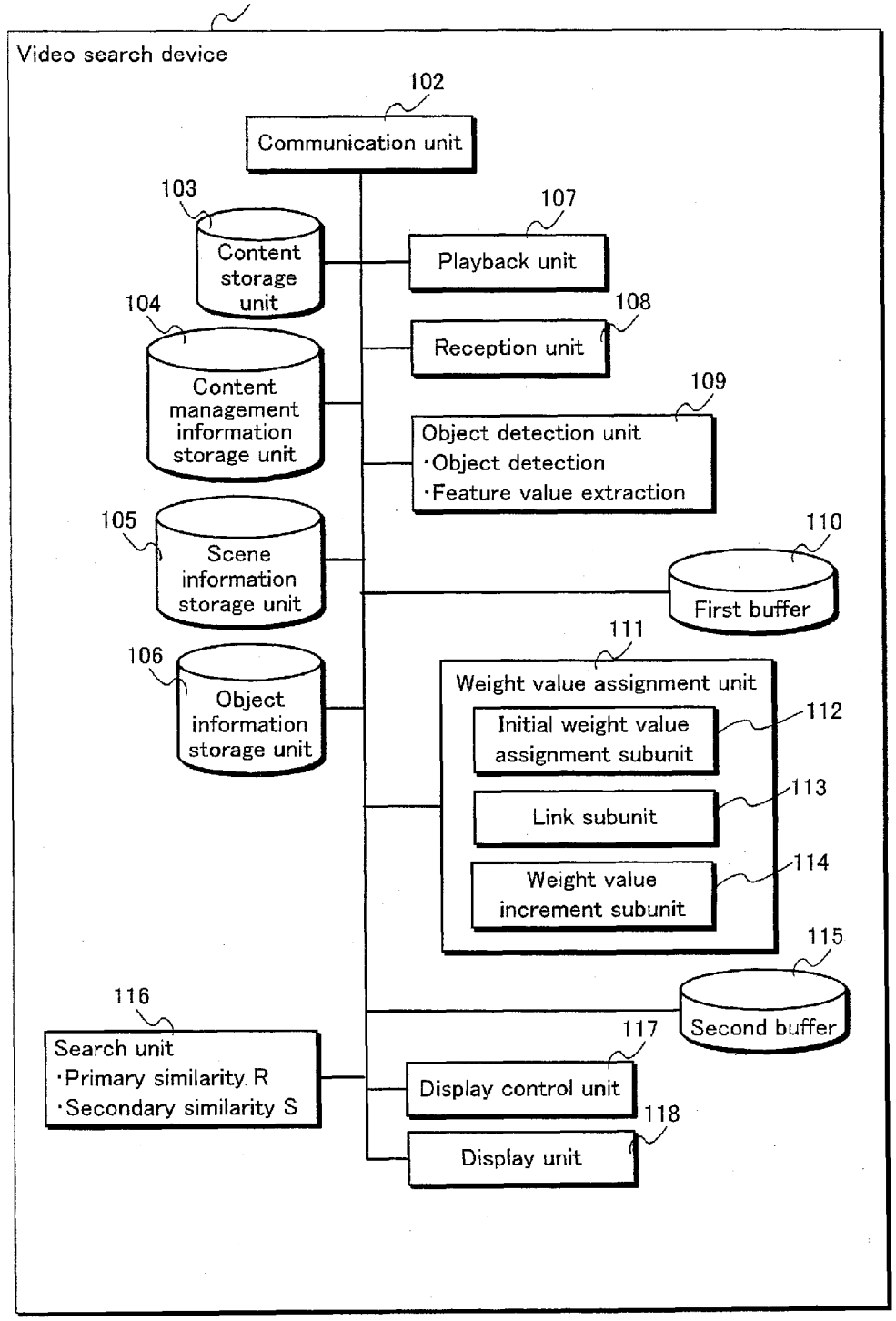
FIG. 1 shows a functional block diagram of a video search device 101.

As shown in FIG. 1, a video search device 101 includes a communication unit 102, a content storage unit 103, a content management information storage unit 104, a scene information storage unit 105, an object information storage unit 106, a playback unit 107, a reception unit 108, an object detection unit 109, a first buffer 110, a weight value assignment unit 111, a second buffer 115, a search unit 116, a display control unit 117, and a display unit 118.

The communication unit 102 has a function of performing various types of communications. The communication unit 102 is for example composed of an NIC (Network Interface Card), and receives a content via a network. Alternatively, the communication unit 102 is composed of an antenna for broadcast wave reception, and receives a content transmitted via a broadcast wave.

Note that a "content" in the present embodiment indicates a video content having a certain playback period, and is hereinafter referred to just as a "content".

The content storage unit 103 stores therein a plurality of contents including a content received by the communication unit 102 and a content input from an external medium (such as an optical disc).

The content management information storage unit 104 stores therein management information with respect to each of the contents stored in the content storage unit 103.

Figure 2:
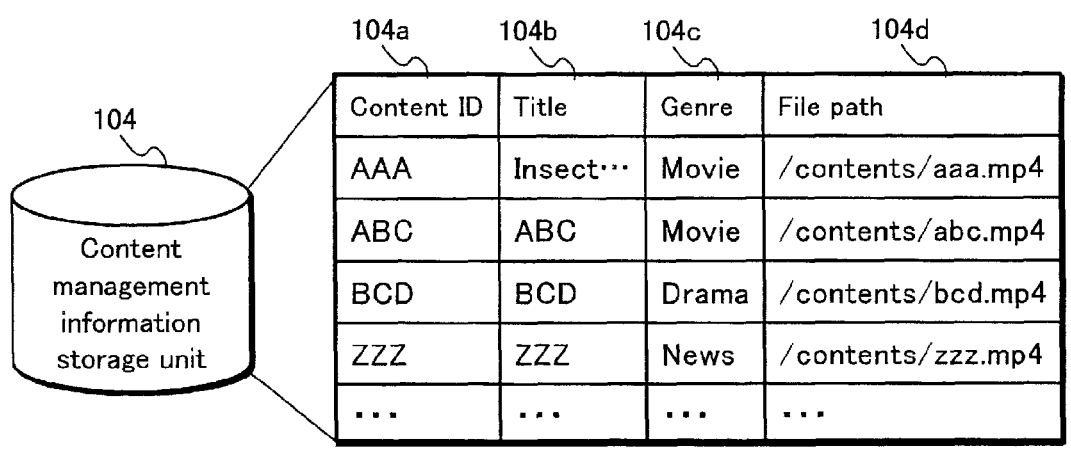
FIG. 2 shows information stored in a content management information storage unit 104.

As shown in FIG. 2, management information with respect to each content contains, for example, items of a "content ID" 104a identifying the content, a "title" 104b of the content, a "genre" 104c of the content, and a "content file path" 104d for specifying a location of the content.

The scene information storage unit 105 stores therein, with respect to each of the contents stored in the content storage unit 103, each of scenes contained in the content and a range of frame numbers of frames belonging to the scene in correspondence with each other.

Figure 3:
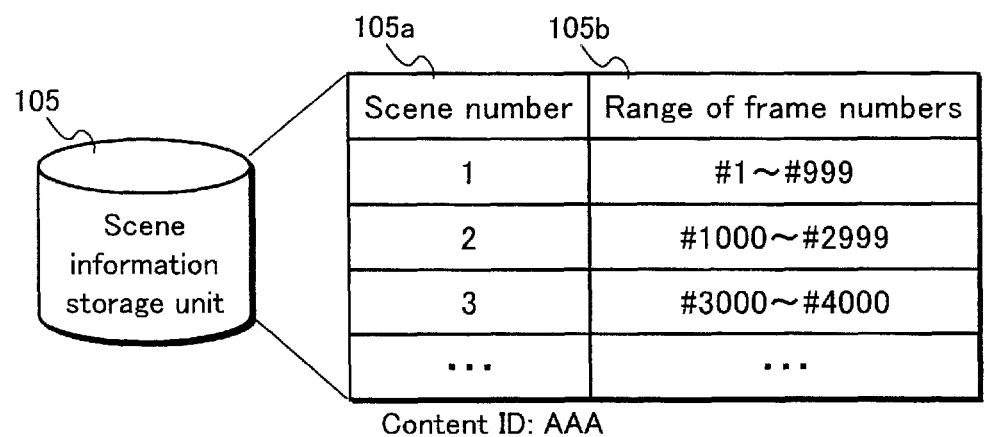
FIG. 3 shows information stored in a scene information storage unit 105.

As shown in FIG. 3, the scene information storage unit 105 stores therein, for example, a "scene number" 105a indicating a number of a scene and a "range of frame numbers" 105b indicating a range of frames corresponding to the scene.

Although FIG. 3 shows information with respect to only one content (having a content ID: AAA), the scene information storage unit 105 stores therein similar information with respect to other contents (having respective content IDs: ABC, BCD, and ZZZ).

The information stored in the scene information storage unit 105 is used by the link subunit 113 to specify a scene corresponding to each object. A scene specification method is described later with reference to FIG. 4A-FIG. 4C.

The object information storage unit 106 stores therein information relating to each of objects contained (appearing) in frames of each of the contents stored in the content storage unit 103.

Figure 5:
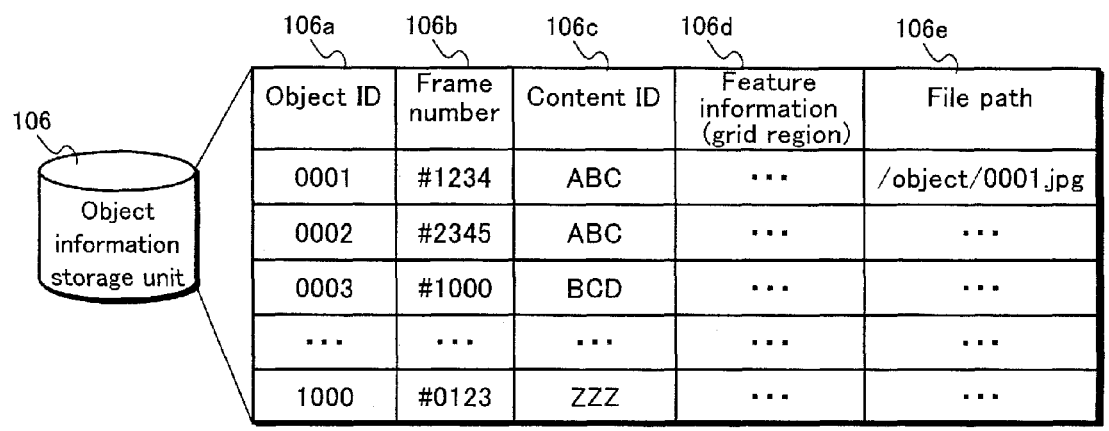
FIG. 5 shows information stored in an object information storage unit 106.

As shown in FIG. 5, the information relating to the object is for example composed of an "object ID" 106a uniquely identifying the object, a "frame number" 106b indicating a number of a frame containing the object, a "content ID" 106c identifying a content containing the frame, "feature information" 106d of the object, and a "file path" 106e indicating a location of a representative frame (a frame firstly pointed by a user).

Note that the information stored in the object information storage unit 106 is created by the object detection unit 109 detecting objects contained in each of the contents stored in the content storage unit 103 and extracting a feature value of each of the objects. An object to be detected in each content may be automatically determined under predesignated setting conditions or may be manually determined (by user designation).

FIG. 6 shows an example of feature information. In FIG. 6, signs "i" and "j" represent grid coordinates, and signs "R", "G", and "B" represent color values of red, green, and blue in 256 steps, respectively. Although described in detail later, the grid coordinate indicates a position of each of grids divided from a frame.

The object information storage unit 106 stores therein feature information such as shown in FIG. 6 with respect to each object. In the present embodiment, feature information such as shown in FIG. 6 is stored with respect to each of 1000 objects having respective object IDs "0001"-"1000".

Figure 7:
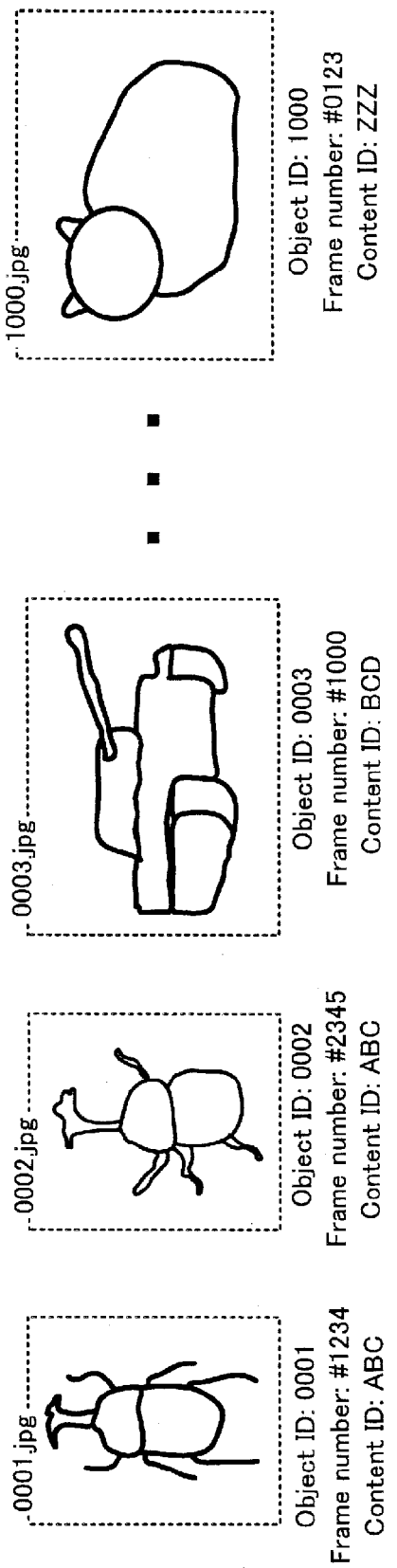
FIG. 7 shows thumbnails in one-to-one correspondence with object ID stored in the object information storage unit 106.

FIG. 7 shows a thumbnail of each of the objects stored in the object information storage unit 106.

Objects having respective object IDs "0001" and "0002" each represent a beetle. An object having an object ID "0003" represents a tank. An object having an object ID "1000" represents a cat.

Note that the above storage units 103-106 are each composed of hardware such as an HDD (Hard Disk Drive).

The description of the functional block shown in FIG. 1 is continued.

The playback unit 107 plays back a content stored in the content storage unit 103, and causes the display unit 118 to display the content that is being played back.

The reception unit 108 receives various types of instructions from the user, such as an instruction to play back a content and designation of a target region based on which an object is to be detected, which is contained in the content that is being played back (designation of the object). In the present embodiment, the reception unit 108 is composed of a capacitance type touch sensor. The reception unit 108 specifies a position on a surface of the touch sensor where the user has pointed (touched) based on variation of an electrostatic capacitance, and receives the specified position as an input. Note that the reception unit 108 may be composed of other general input device such as a remote control.

The object detection unit 109 detects the object based on the designated region received by the reception unit 108, and extracts a feature value of the object.

The first buffer 110 stores therein feature information of the object detected by the object detection unit 109.

The weight value assignment unit 111 assigns, to each of the objects stored in the first buffer 110, a weight value that influences a search score (secondary similarity). The weight value assignment unit 111 includes an initial weight value assignment subunit 112, a link subunit 113, and a weight value increment subunit 114.

Figure 11:
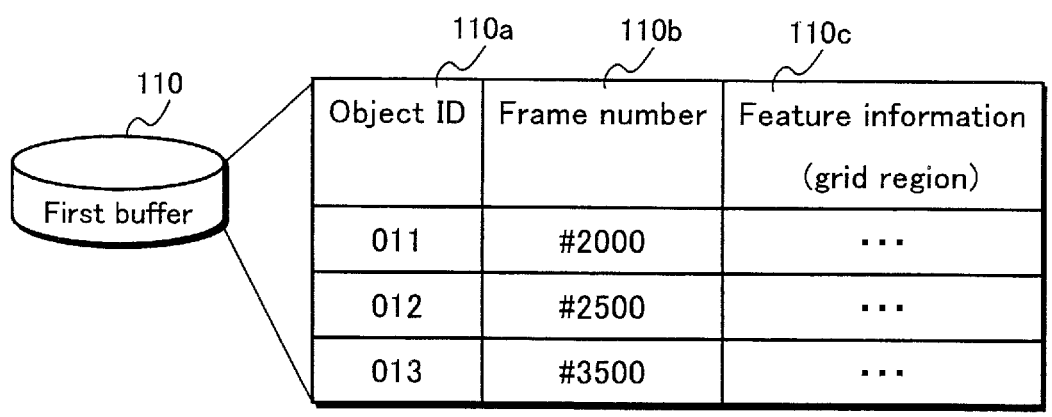
FIG. 11 shows information stored in a first buffer 110.

The initial weight value assignment subunit 112 assigns an initial weight value to each of the objects stored in the first buffer 110. FIG. 11 shows an example where a weight value of 0.5 is assigned to each of objects having respective object IDs "011", "012", and "013". FIG. 13A shows the concept of assignment of an initial weight value.

The link subunit 113 makes a link between two or more of the objects stored in the first buffer 110. In the present embodiment, the link subunit 113 refers to the scene information storage unit 105 makes a link between objects which are contained in respective frames belonging to the same scene.

FIG. 11 shows an example where:

the object ID "011" corresponds to the frame number #2000, and accordingly corresponds to the scene number "2";

the object ID "012" corresponds to the frame number #2500, and accordingly corresponds to the scene number "2"; and the object ID "013" corresponds to the frame number #3500, and accordingly corresponds to the scene number "3".

Accordingly, the object ID "011" and the object ID "012" are common in correspondence to the scene number "2". The link subunit 113 links the object having the object ID "012" to the object having the object ID "011", and links the object having the object ID "012" to the object having the object ID "011".

After completing the link, the weight value increment subunit 114 increments a weight value of each of the objects linked to each other.

In an example shown in FIG. 13B, the weight value increment subunit 114 increments, by a value of "0.3", the weight value of each of the objects having the respective object IDs "011" and "012" that are linked to each other.

Figure 14:
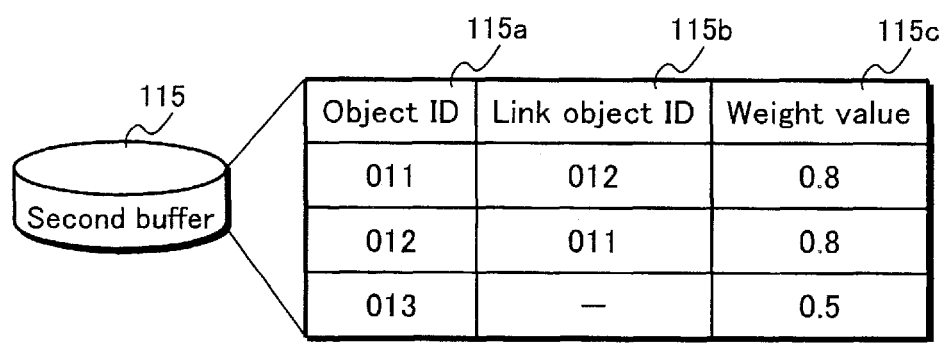
FIG. 14 shows information stored in a second buffer 115.

After completing the series of processing relating weight value, the weight value assignment unit 111 stores a processing result in a second buffer 115. FIG. 14 shows an example of information stored in the second buffer 115.

As shown FIG. 14, the second buffer 115 stores therein an "object ID" 115*a*, a "linked object ID" 115*b* identifying an object linked to an object identified by the object ID 115*a*, and a "weight value" 115*c* of the object identified by the object ID 115*a*.

The search unit 116 searches the objects stored in the object information storage unit 106 for an object similar to the object having the object ID 115*a*, based on the information stored in the first buffer 110 and the information stored in the second buffer 115.

Note that the playback unit 107, the reception unit 108, the object detection unit 109, and the weight value assignment unit 111 described above are realized by a CPU executing a control program stored in a ROM, for example.

The display control unit 117 controls display of the display unit 118.

The display unit 118 is for example composed of a liquid crystal touch screen 801. Note that the display unit may be built into the video search device or separated from the video search device.

<Operations>

Next, operations of the video search device 101 are described.

Firstly, the following describes a flow of operations of corresponding a scene number to each object, with reference to FIG. 4A-FIG. 4C and FIG. 35.

FIG. 4A shows the relation between ranges of frame number and scene numbers.

FIG. 4B shows three frames (having respective frame numbers "#1001", "#2997", and "#3001") and objects (having respective object IDs "001", "002", and "003") contained in the respective frames.

FIG. 4C shows frame numbers and scene numbers corresponding to the respective object IDs.

Figure 35:
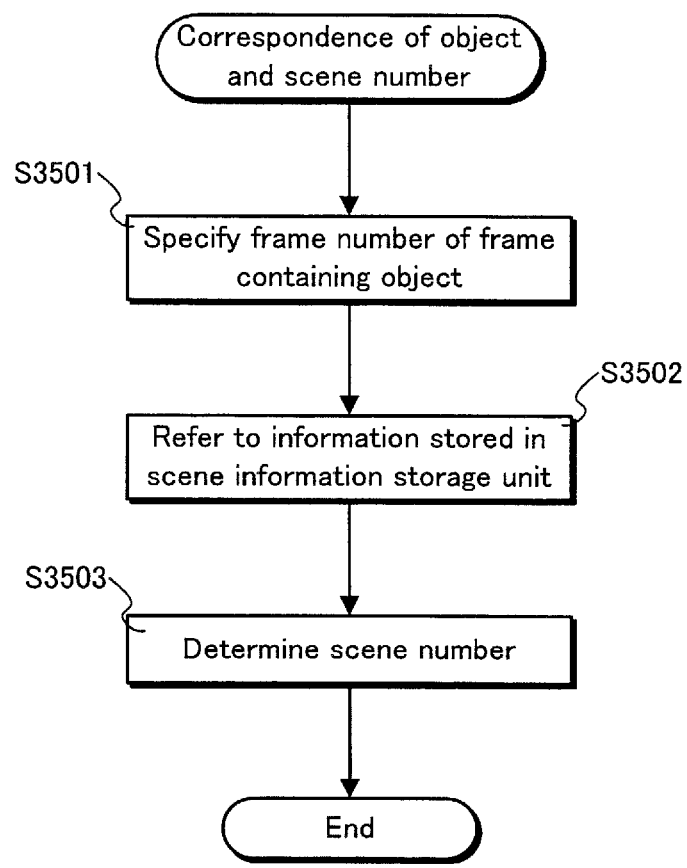
FIG. 35 is a flowchart of operations for corresponding a scene number to each object.

This correspondence is made as shown in FIG. 35. Firstly, the link subunit 113 specifies a frame number of a frame containing a target object (S3501). As the frame containing the target object, the link subunit 113 selects a representative frame (a frame firstly pointed by the user), for example.

Next, the link subunit 113 refers to the information stored in the scene information storage unit 105 (S3502) to determine a scene number corresponding to the specified frame number (S3503).

For example, the link subunit 113 specifies the frame number "#1001" of the frame containing the object having the object ID "001". Then, the link subunit 113 refers to the information stored in the scene information storage unit 105 to determine the scene number "2" as a scene number corresponding to the frame number "#1001".

Figure 8:
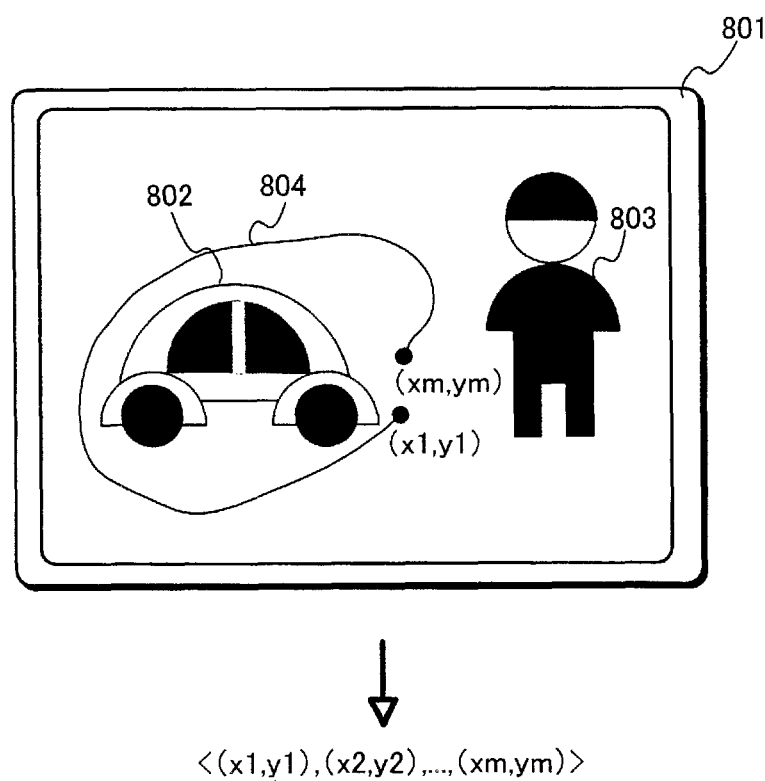
FIG. 8 shows region designation.
Figure 9A:
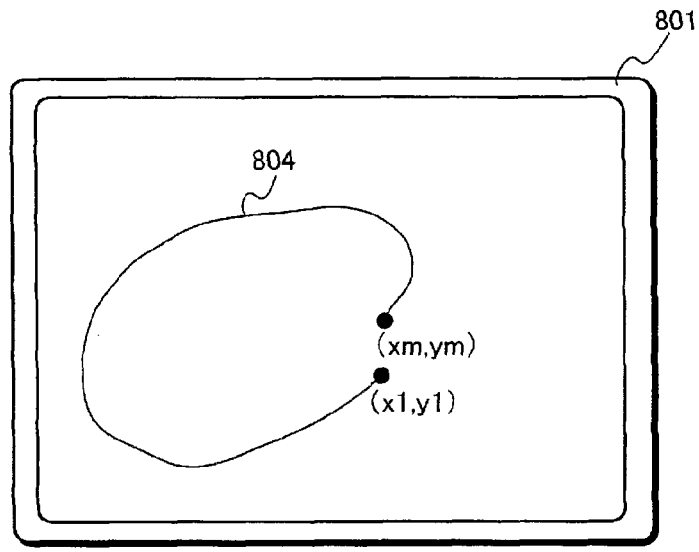
FIG. 9A and FIG. 9B show extraction of a feature value from a designated region (object).
Figure 9B:
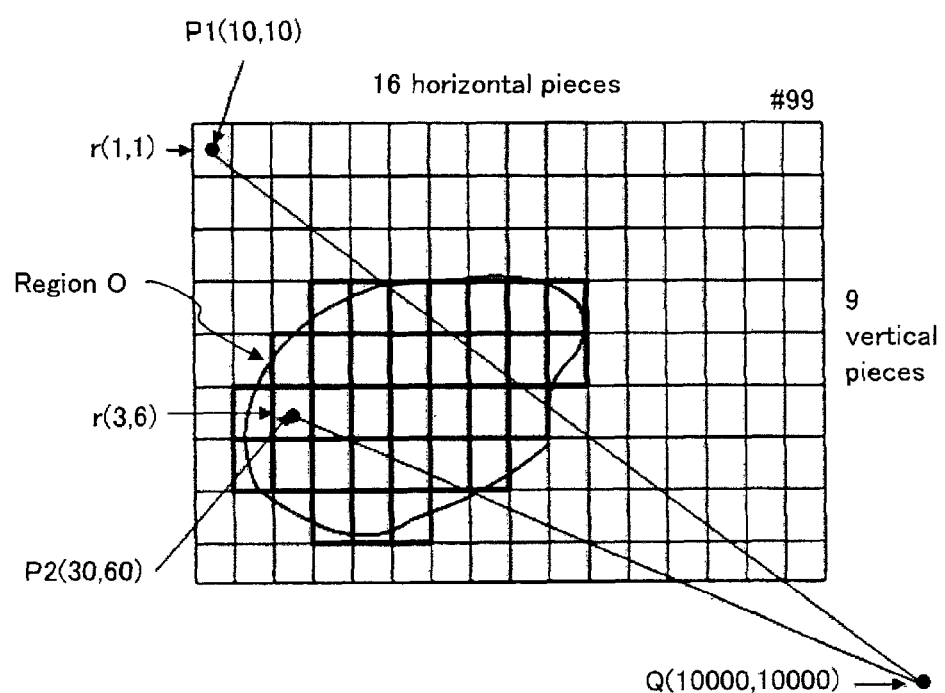

Next, the following describes a flow of operations of the reception unit 108 of receiving designation of a region and operations of the object detection unit 109 of detecting an object and extracting a feature value of the detected object, with reference to FIG. 8, FIG. 9A, and FIG. 9B.

As shown in FIG. 8, the touch screen 801 displays an object 802 representing a car and an object 803 representing a man. A trajectory 804 is a trajectory of points input by the user.

The object detection unit 109 detects, as a target object, a region defined by the trajectory 804.

Then, the object detection unit 109 extracts a feature value with respect to the region defined by the trajectory 804 detected as the target object.

As shown in FIG. 9B, the object detection unit 109 divides a representative frame (a frame having a frame number "#99" in the example shown in FIG. 9B) into grid regions of w horizontal pieces by h vertical pieces (16 horizontal pieces by 9 vertical pieces in the example shown in FIG. 9B). Here, each of the divided grid regions r satisfies $r(i,j): 1 \leq i \leq w, 1 \leq j \leq h$.

Next, the object detection unit 109 extracts a group of grid regions R(O) from a region O that contains the target object. The following shows a method of judging whether a grid region r(i,j) is contained in the region O.

Firstly, a line segment, which connects the center of gravity P(x,y) of the grid region r(i,j) and a point Q that is extremely distant from the center of gravity P, is set to a line segment P-Q. The number of intersection points between the line segment P-Q and the region O is set to N(P-Q,O).

If the number of intersection points N(P-Q,O) is odd, it is judged that the grid region r(i,j) is contained in the region O. If the number of intersection points N(P-Q,O) is even, it is judged that the grid region r(i,j) is not contained in the region O. In this way, the group of grid regions R(O) contained in the region O is extracted.

In the example shown in FIG. 9B, a line segment P1-Q, which connects the center of gravity P1(10,10) of a grid region r(1,1) and a point Q(10000,10000) that is extremely distant from the center of gravity P1(10,10), intersects the region O at two points. Accordingly, the grid region r(1,1) is not contained in the region O. Compared with this, a line segment P2-Q, which connects the center of gravity P2(30, 60) of a grid region r(3,6) and the point Q, intersects the region O at one point. Accordingly, the grid region r(3,6) is contained in the region O.

Then, the object detection unit 109 calculates feature value information c(i,j) with respect to each grid region r(i,j)∈R(O) contained in the region O.

Here, the feature value information c(i,j) represents a color having the highest chromaticity in the grid region r(i,j). Feature value information detected by the object detection unit 109 is managed in table format in correspondence with the respective grid regions r(i,j).

FIG. 10 shows an example of feature information. The format of feature information shown in FIG. 10 is the same as that shown in FIG. 6. Feature information is correspondence with an object ID "xx", a frame number "#100", and a content ID "ABC".

Each time the reception unit 108 receives designation of a region, the object detection unit 109 detects an object from the designated region, and extracts a feature value of the detected object. Then, the object detection unit 109 stores the extracted feature information and so on in the first buffer 110.

FIG. 11 shows information stored in the first buffer 110.

The first buffer 110 stores therein an "object ID" 110a identifying an object, a "frame number" 110b of a frame containing the object, and "feature information" 110c of the object.

FIG. 12 schematically shows information stored in the first buffer 110 shown in FIG. 11. Objects having respective object IDs "011" and "012" each represent a beetle. An object having an object ID "013" represents a cat.

Note that FIG. 12 shows an image of each of the objects for convenience of description. Actually, data format in the first buffer 110 is similar to that of feature information such as shown in FIG. 10.

Next, main operations of the video search device 101 are described with reference to a flowchart shown in FIG. 15.

Figure 15:
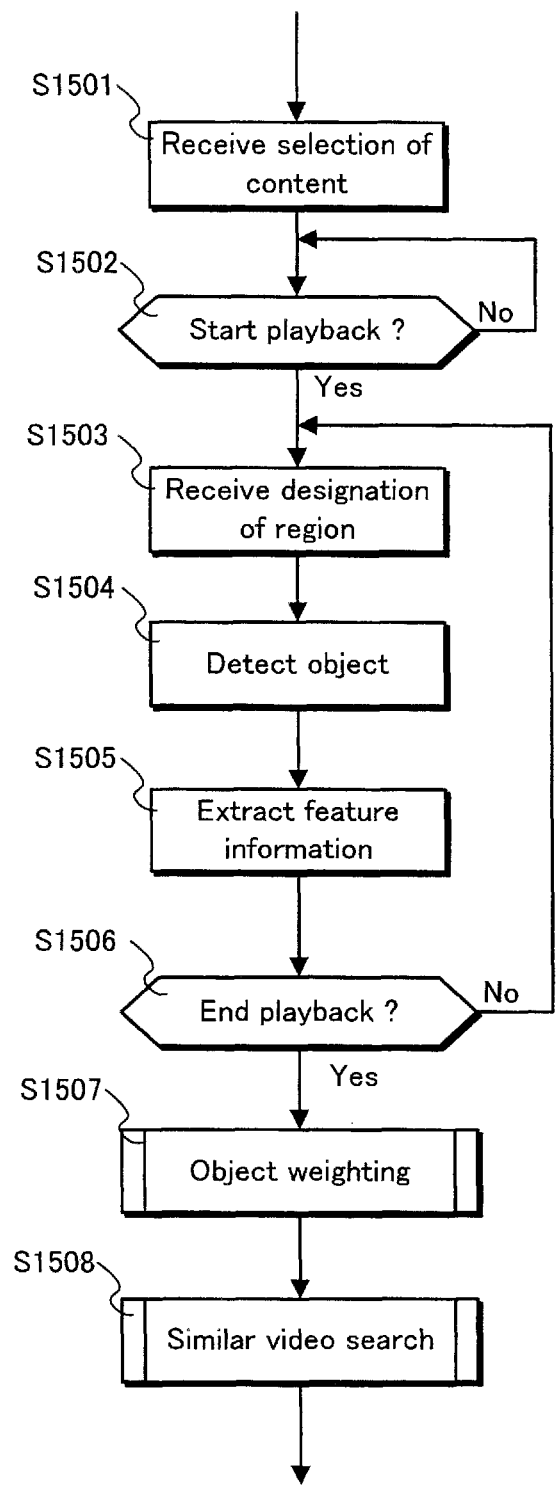
FIG. 15 is a flowchart showing main operations.
Figure 16:
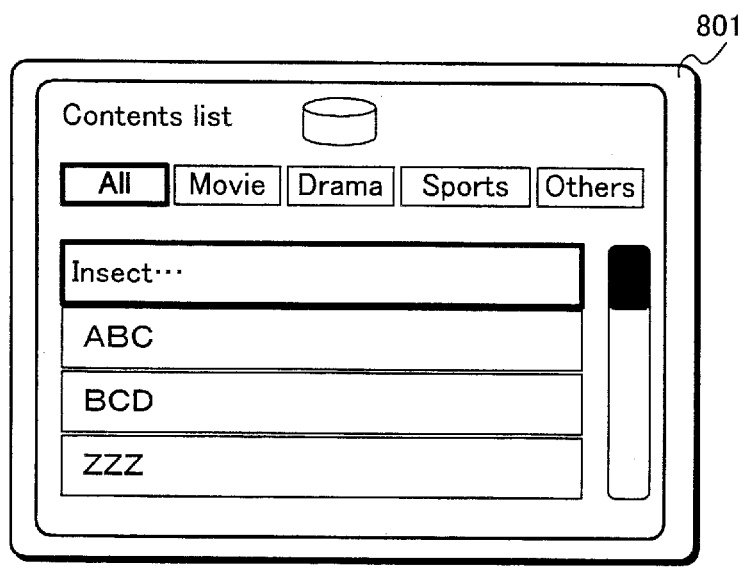
FIG. 16 shows a screen of a touch screen 801.

As shown in FIG. 15, firstly, the reception unit 108 receives selection of a content to be played back (S1501). FIG. 16 shows a screen of the touch screen 801 corresponding to the state in Step S1501 shown in FIG. 15.

In response to the reception of selection of the content, the playback unit 107 starts playing back the content (S1502), and then the reception unit 108 waits for designation of an object.

In subsequent Steps S1503-S1505, processing described with reference to FIG. 8, FIG. 9A, and FIG. 9B is performed. Specifically, the reception unit 108 receives designation of a region (S1503). The object detection unit 109 detects an object from the received region (S1504), and extracts a feature value of the detected object (S1505).

The processing in Steps S1503-S1505 is repeated until playback of the contents ends (S1506: Yes).

Note that the objects having the respective object IDs "011", "012", and "013" are stored in the first buffer 110 by the object detection unit 109 after repeating the processing in Steps S1503-S1505 three times.

After playback of the contents ends, the flow proceeds to object weighting processing (S1507).

Figure 17:
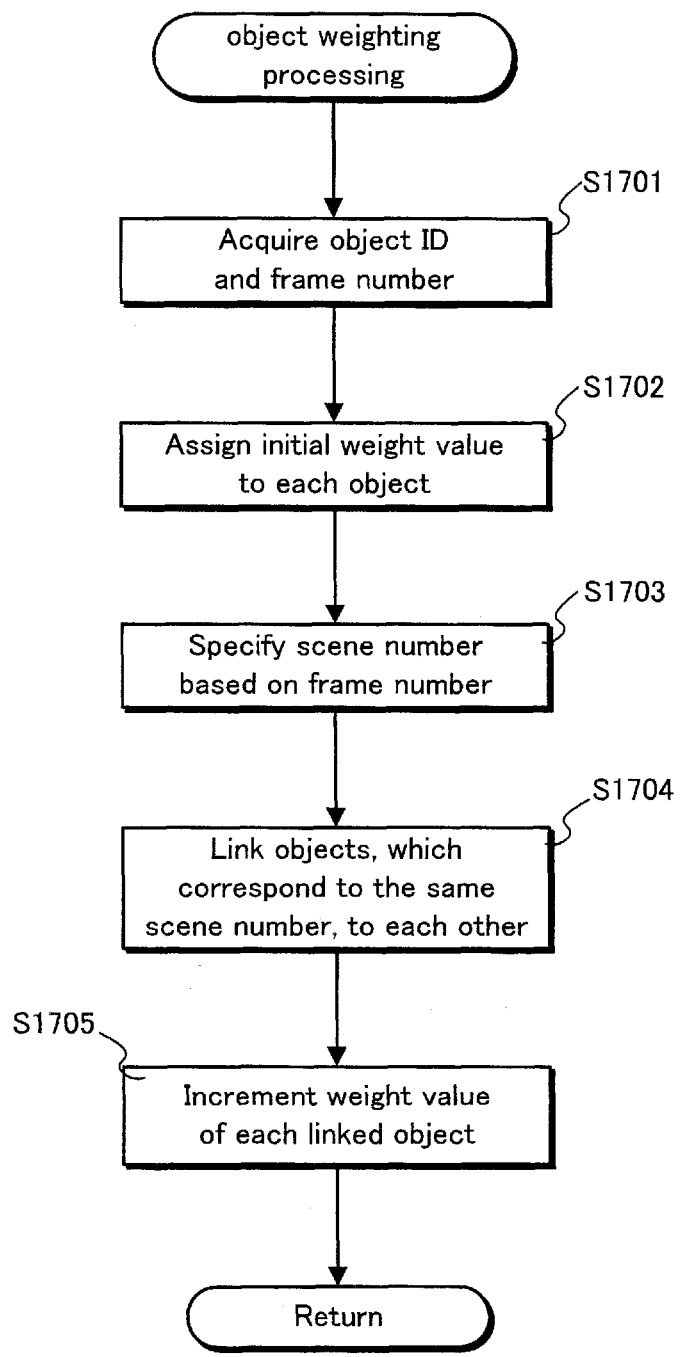
FIG. 17 is a flowchart of object weighting processing.

In the object weighting processing as shown in FIG. 17, the weight value assignment unit 111 acquires the object IDs and frame numbers corresponding to the respective object IDs from the first buffer 110 (S1701). The initial weight value assignment subunit 112 assigns an initial weight value of "0.5" to each of objects having the respective acquired IDs (S1702).

Then, the link subunit 113 refers to the information stored in the scene information storage unit 105, thereby to specify scene numbers corresponding to the respective frame numbers acquired in Step S1701 (S1703). As a result, scene numbers corresponding to the respective object IDs are specified.

Next, the link subunit 113 makes a link between objects which correspond to the same scene number, based on the specified scene numbers (S1704).

The weight value increment subunit 114 increments a weight value of each of the objects linked in Step S1704 by a value of "0.3". The weight value increment subunit 114 outputs a result of the series of processing to the second buffer 115 (S1705).

In the example of the information stored in the second buffer 115 shown in FIG. 14, the objects having the respective object IDs "011" and "012" belong to the same scene having the scene number "2". Accordingly, the object having the object ID "011" has, as its linked object, the object having the object ID "012". The object having the object ID "012" has, as its linked object, the object having the object ID "011". The objects having the respective object IDs "011" and "012" each have a weight value of "0.8", which resulted from incrementing an initial weight value of "0.5" by a value of "0.3".

After the object weighting processing completes (FIG. 15: S1507), the flow proceeds to similar video search processing (S1508).

Figure 18:
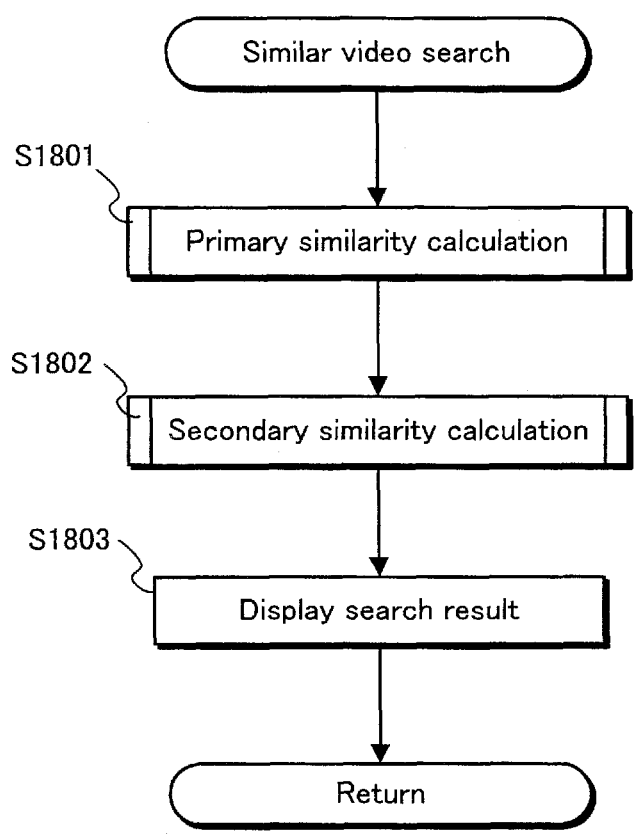
FIG. 18 is a flowchart of similar video search processing.

As shown in FIG. 18, the similar video search processing includes primary similarity calculation processing (S1801) of calculating a primary similarity based on feature information of an object for use in search and secondary similarity calculation processing (S1802) of calculating a secondary similarity based on the calculated primary similarity and a weight value of an object linked to the object for use in search.

Figure 19:
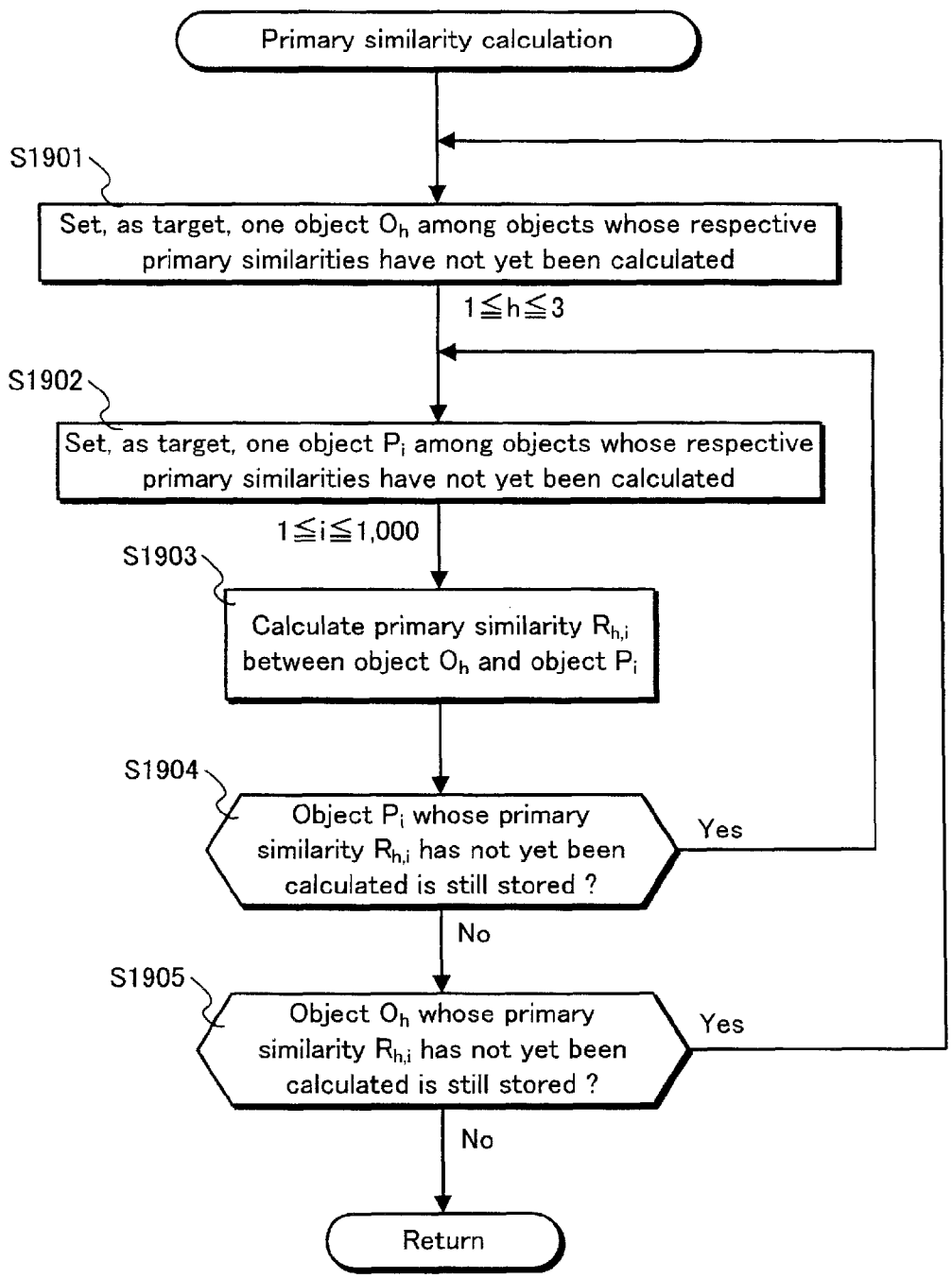
FIG. 19 is a flowchart of primary similarity calculation processing.

As shown in FIG. 19, in the primary similarity calculation processing, the search unit 116 sets, as a calculation target, one object $O_h$ whose primary similarity has not yet been calculated, among objects stored in the first buffer 110 (S1901). Then, the search unit 116 acquires feature information of the object $O_h$ set as the calculation target.

Here, an example of Step S1901 is described. The first buffer 110 stores therein three objects $O_1$, $O_2$, and $O_3$ (having respective object IDs "011", "012", and "013") (see FIG. 11). The search unit 116 sets the object $O_1$ as a calculation target, and acquires feature information of the object $O_1$.

Next, the search unit 116 sets, as a calculation target, one object $P_i$ whose primary similarity has not yet been calculated among objects stored in the object information storage unit 106 (S1902). Then, the search unit 116 acquires feature information of the object $P_i$ set as the calculation target.

Here, an example of Step S1902 is described. The object information storage unit 106 stores therein one thousand objects of objects $P_1$, $P_2$, $P_3$ (having respective object IDs "0001", "0002", "0003"), ... (see FIG. 5). The search unit 116 sets the object $P_1$ as a calculation target, and acquires feature information of the object $P_1$.

Next, the search unit 116 calculates a primary similarity $R_{h,i}$ between the object $O_h$ set in Step S1901 and the object $P_i$ set in Step S1902 (S1903).

Specifically, the search unit 116 performs template matching processing on the object $P_i$, with use of the feature information of the object $O_h$ (grid region and feature color information thereof) as a template. This results in the primary similarity $R_{h,i}$ between the object $O_h$ and the object $P_i$.

This template matching processing is performed by moving a template over an input image while superimposing the template on the image to check the correlation therebetween in feature color, thereby to judge a similarity therebetween. The template matching processing may be performed with use of a conventional method such as the method disclosed in the above Patent Literature 2.

Note that the primary similarity $R_{h,i}$ calculated by the search unit 116 is normalized to a value of 0-1. The greater the normalized value is, the higher the primary similarity $R_{h,i}$ is.

If an object $P_i$ whose primary similarity $R_{h,i}$ has not yet been calculated is still stored (S1904: Yes), the flow returns to Step S1902.

Also, if an object $O_h$ whose primary similarity $R_{h,i}$ has not yet been calculated is still stored (S1905: Yes), the flow returns to Step S1901.

Repetition of such a series of processing results in calculation of the primary similarity with respect to each of three thousand combinations ($R_{1,1}$, $R_{1,2}$, . . . , $R_{1,1000}$, $R_{2,1}$, $R_{2,2}$, . . . , $R_{3,1000}$). The primary similarity is obtained between each of the three objects $O_1$-$O_3$ stored in the first buffer 110 and each of the one thousand objects $P_1$-$P_{1000}$ stored in the object information storage unit 106.

Figure 20:
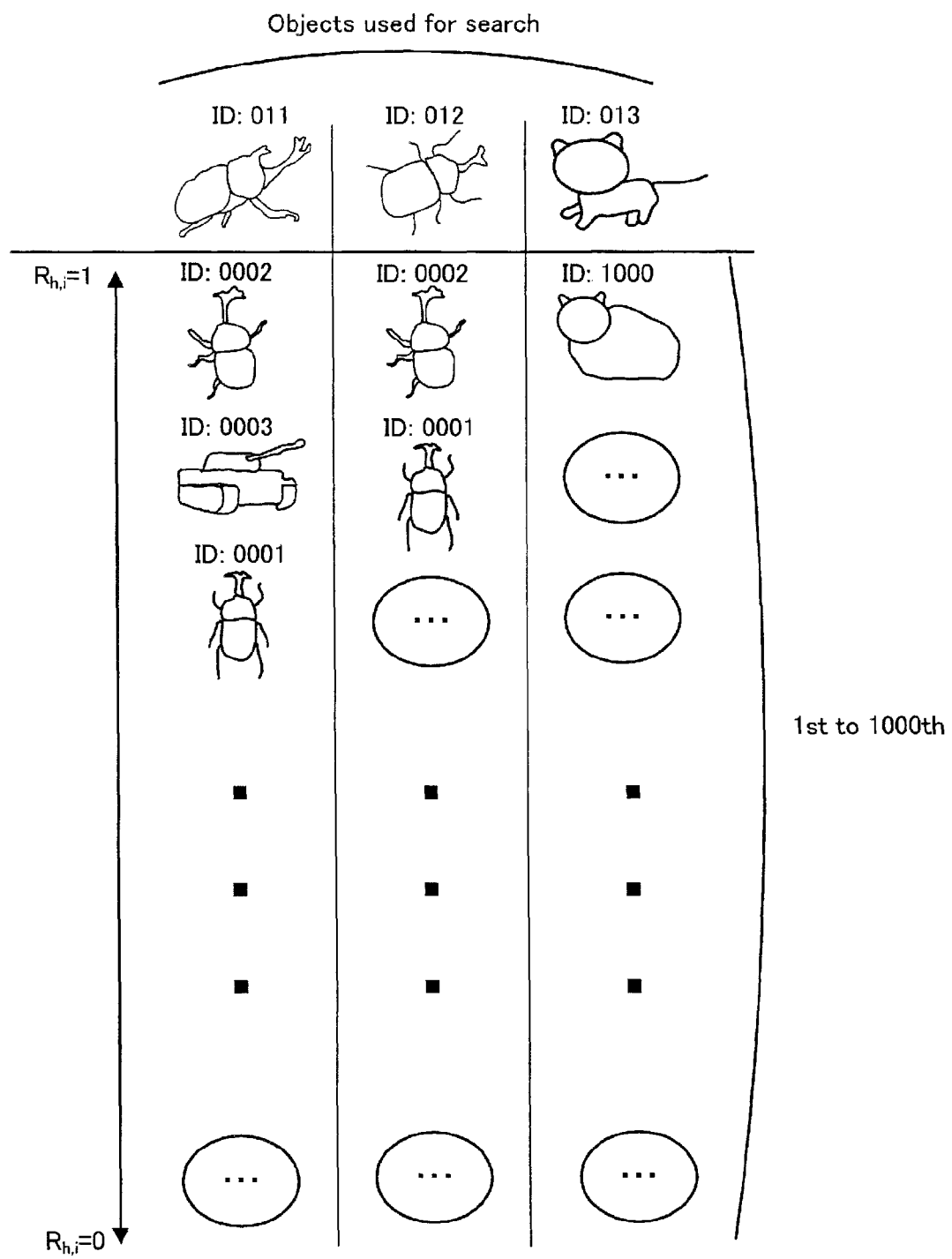
FIG. 20 shown an example of calculated primary similarities.

FIG. 20 shows an example of the primary similarity $R_{h,i}$. The object representing a beetle and having the object ID "012" has a higher similarity with each of the objects representing a beetle and having the respective object IDs "0002" and "0001". The object having the object ID "011" has the second highest similarity with the object representing a tank having the object ID "0003", in addition to a higher similarity with each of the objects having the respective object IDs "0002" and "0001". The object representing a tank having the object ID "0003" happens to be similar just in color combination to the object representing a beetle having the object ID "011". Accordingly, this result is considered disappointing to a user who searched using the object ID "011" (who wants to find an object representing a beetle).

Next, the secondary similarity calculation processing is described.

Figure 21:
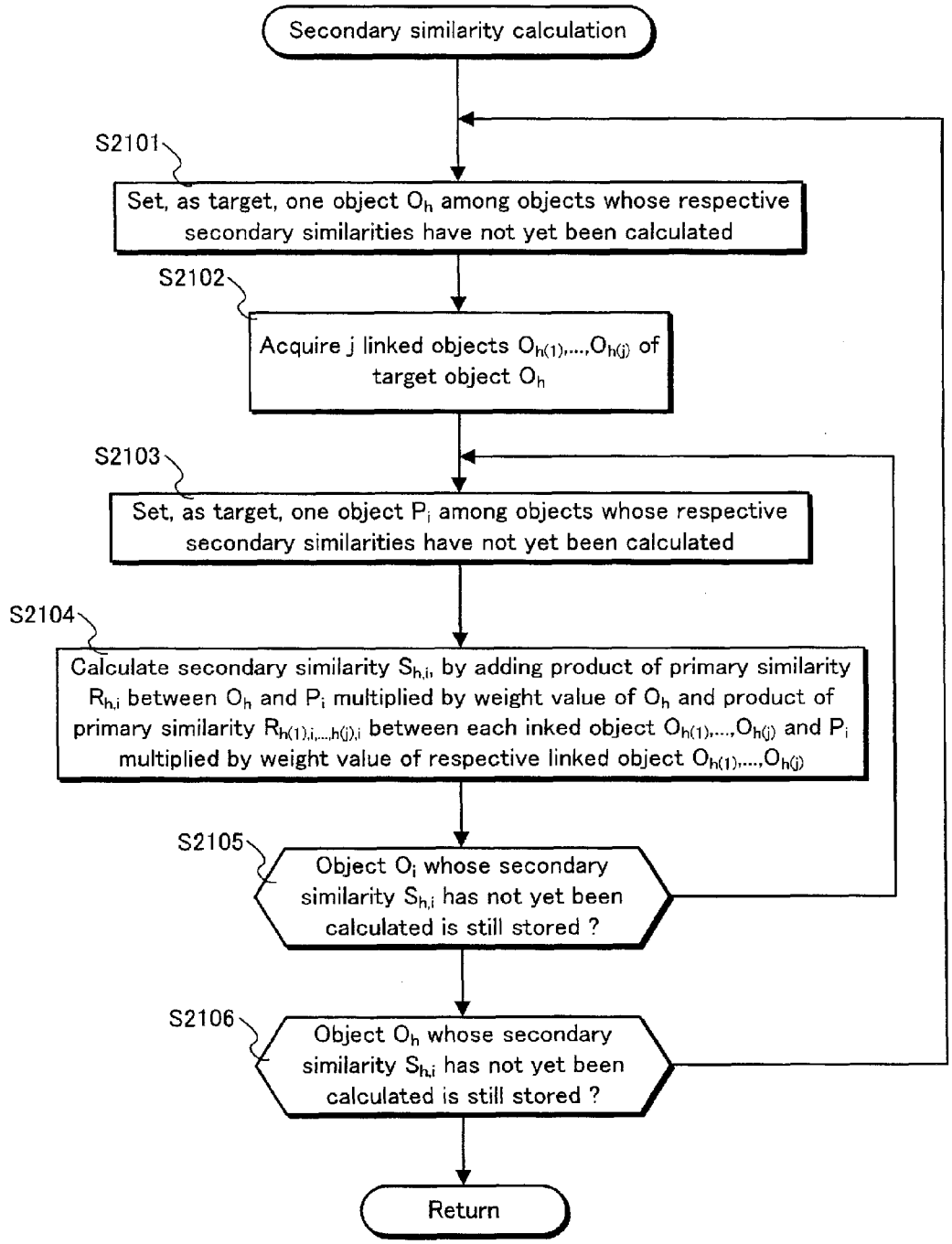
FIG. 21 is a flowchart of secondary similarity calculation processing.

As shown in FIG. 21, in the secondary similarity calculation processing, the search unit 116 sets, as a calculation target, one object $O_h$ whose secondary similarity has not yet been calculated, among objects stored in the first buffer 110 (S2101). Then, the search unit 116 refers to the second buffer 115 to acquire a linked object of the object $O_h$ that is set as the calculation target (S2102).

The search unit 116 sets, as a calculation target, one object $P_i$ whose secondary similarity has not yet been calculated among objects stored in the object information storage unit 106 (S2103).

Next, the search unit 116 multiplies the primary similarity $R_{h,i}$ between the object $O_h$ and the object $P_i$ acquired in Step S2103 by a weight value of the object $O_h$. Also, the search unit 116 multiplies the primary similarity $R_{h(1), i, \ldots, h(j), i}$, which is a primary similarity between each object $O_{h(1)}$, . . . , $O_{h(j)}$ that is a linked object of the object $O_h$ and the object $P_i$, by a weight value of the respective linked object. Then, the search unit 116 adds all products of the multiplications thereby to calculate a secondary similarity $S_{h,i}$ (S2104).

A specific example of Step S2104 is described with reference to FIG. 22 and FIG. 23, on the assumption that the object $I_1$ is set as a calculation target in Step S2101 and the object $P_1$ is set as a calculation target in Step S2103.

Figure 22:
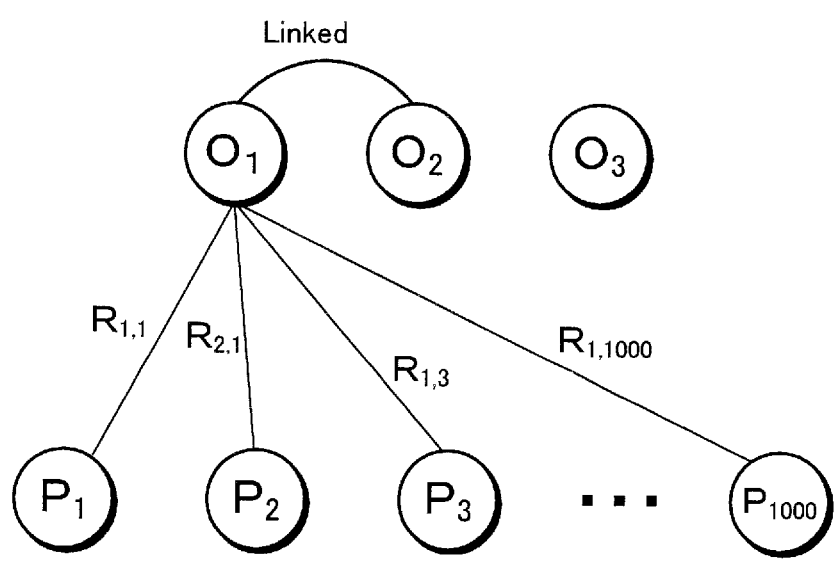
FIG. 22 describes a primary similarity of an object $O_1$.

As shown in FIG. 22, the primary similarity between the object $O_1$ and each of the objects $R_{1,1}$-$R_{1,1000}$ is calculated. The object $O_1$ is linked to the object $O_2$ (the object $O_1$ has the object $O_2$ as its linked object).

The secondary similarity $S_{1,1}$ between the object $O_1$ and the object $P_1$ is calculated by the following equation, as shown in FIG. 23.

$$S_{1,1} = R_{1,1} \times w1 + R_{2,1} \times w2 \quad \text{(Equation 1)}$$

In the equation 1, a former member "$R_{1,1} \times w1$" is a product of the primary similarity $R_{1,1}$ between the object $O_1$ and the target object $P_1$ multiplied by a weight value w1 of the object $O_1$.

A latter member "$R_{2,1} \times w2$" is a product of the primary similarity $R_{2,1}$ between the object $O_2$, which is a linked object of the object $O_1$, and the target object $P_1$ multiplied by a weight value w2 of the object $O_2$.

A secondary similarity S is calculated as follows. A primary similarity is calculated between an object $O_h$ detected by the object detection unit 109 and an object $P_i$ stored in the object information storage unit 106, and then the calculated primary similarity is multiplied by a weight value of the object $O_h$. Also, a primary similarity is calculated between an object $O_{h(1)}$, which is linked to the object $O_h$, and the object $P_i$, and then the calculated primary similarity is multiplied by a weight value of the object $O_{h(1)}$. All of the products of the multiplication are added, thereby to obtain the secondary similarity S.

As the number of objects $O_{h(1)}$, $O_{h(2)}$, . . . which are each linked to the object $O_h$ increases, a higher secondary similarity is obtained.

Figure 24:
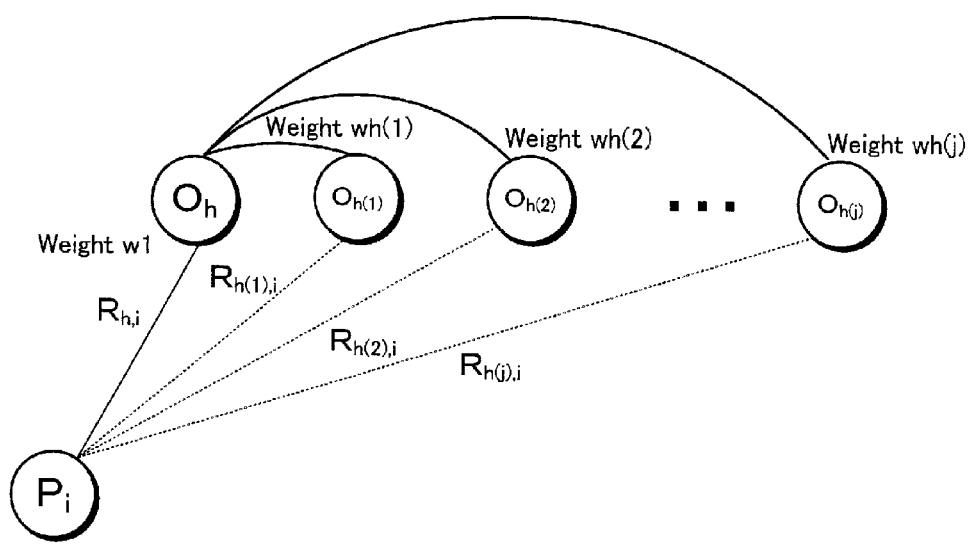
FIG. 24 describes a method of calculating secondary similarity between an object $O_h$ and an object $P_1$.

FIG. 24 shows the generalized concept of a method of calculating the secondary similarity. Here, a secondary similarity is calculated between an object $O_h$, which has j linked objects, and an object $P_i$.

The search unit 116 repeatedly performs such a series of processing thereby to calculate the secondary similarities ($S_{1,1}$, $S_{1,2}$, . . . , $S_{1,1000}$, $S_{2,1}$, $S_{2,2}$, . . . , $S_{3,1000}$) based on the primary similarities ($R_{1,1}$, $R_{1,2}$, . . . , $R_{1,1000}$, $R_{2,1}$, $R_{2,2}$, . . . , $R_{3,1000}$) (S2105 and S2106).

Figure 25:
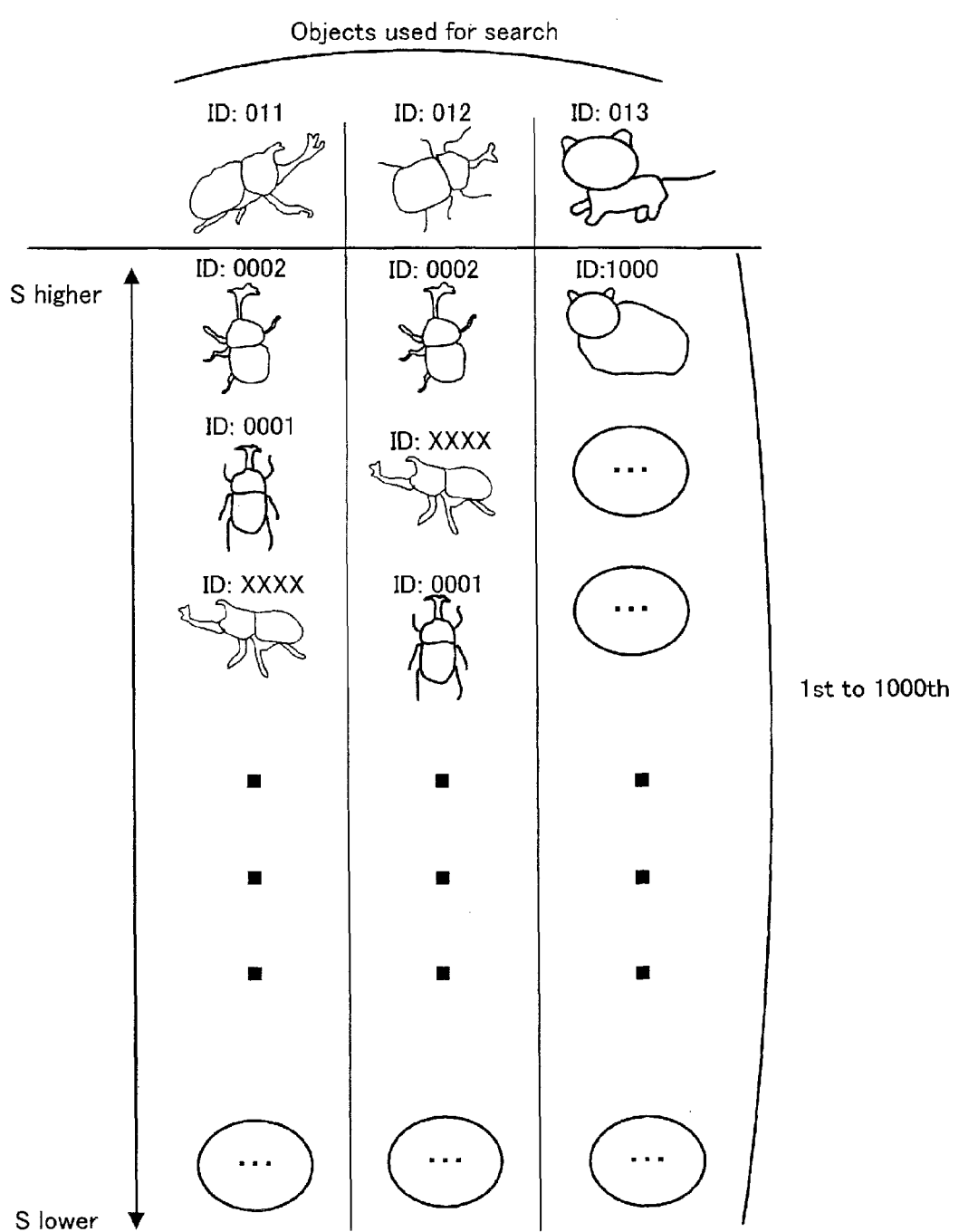
FIG. 25 shown an example of calculated secondary similarity.

FIG. 25 shows an example of the secondary similarity.

After completing the secondary similarity calculation processing (FIG. 18: S1802), the search unit 116 displays a search result (S1803).

Figure 26:
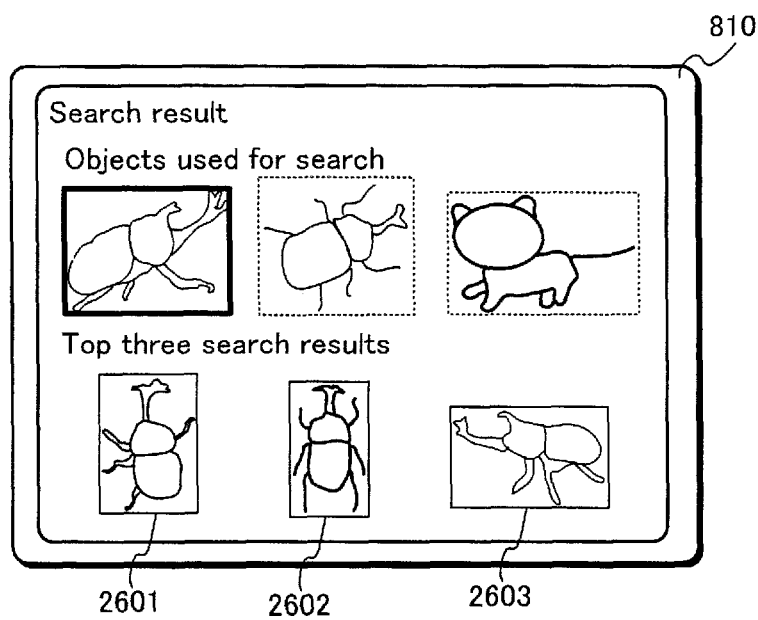
FIG. 26 shows an example of display of search result on the touch screen 801.

FIG. 26 shows an example of a search result. On the upper stage of the touch screen 801, three thumbnails of the objects (having respective object IDs "011", "012", and "013") used for search are displayed. On the lower stage of the touch screen 801, thumbnails 2601-2603 of objects, which are top three results in secondary similarity with the object having the object ID "011", are displayed.

For example, when the reception unit 108 receives selection of the thumbnail 2601, the search unit 116 specifies, among the information stored in the object information storage unit 106, a frame number "#1234" of a frame, which contains the object having the object ID "0002" (see FIG. 7) corresponding to the thumbnail 2601, and a content ID "ABC" of a content, which contains the frame having the frame number "#1234". Then, the search unit 116 causes the playback unit 107 to play back the content having the content ID "ABC", starting with a frame having a frame number slightly smaller than the frame number "#1234".

Note that the search result shown in FIG. 24 is just one example. Alternatively, the following may be employed for example that top three objects in a search result are displayed after the secondary similarity with respect to each of the three object used for search is averaged. Also, the number of objects to be displayed as objects ranked higher in the search result may be arbitrary, without limiting to the top three objects. Furthermore, in addition to the ranking of search result, the secondary similarity (search score) may be displayed.

Figure 27:
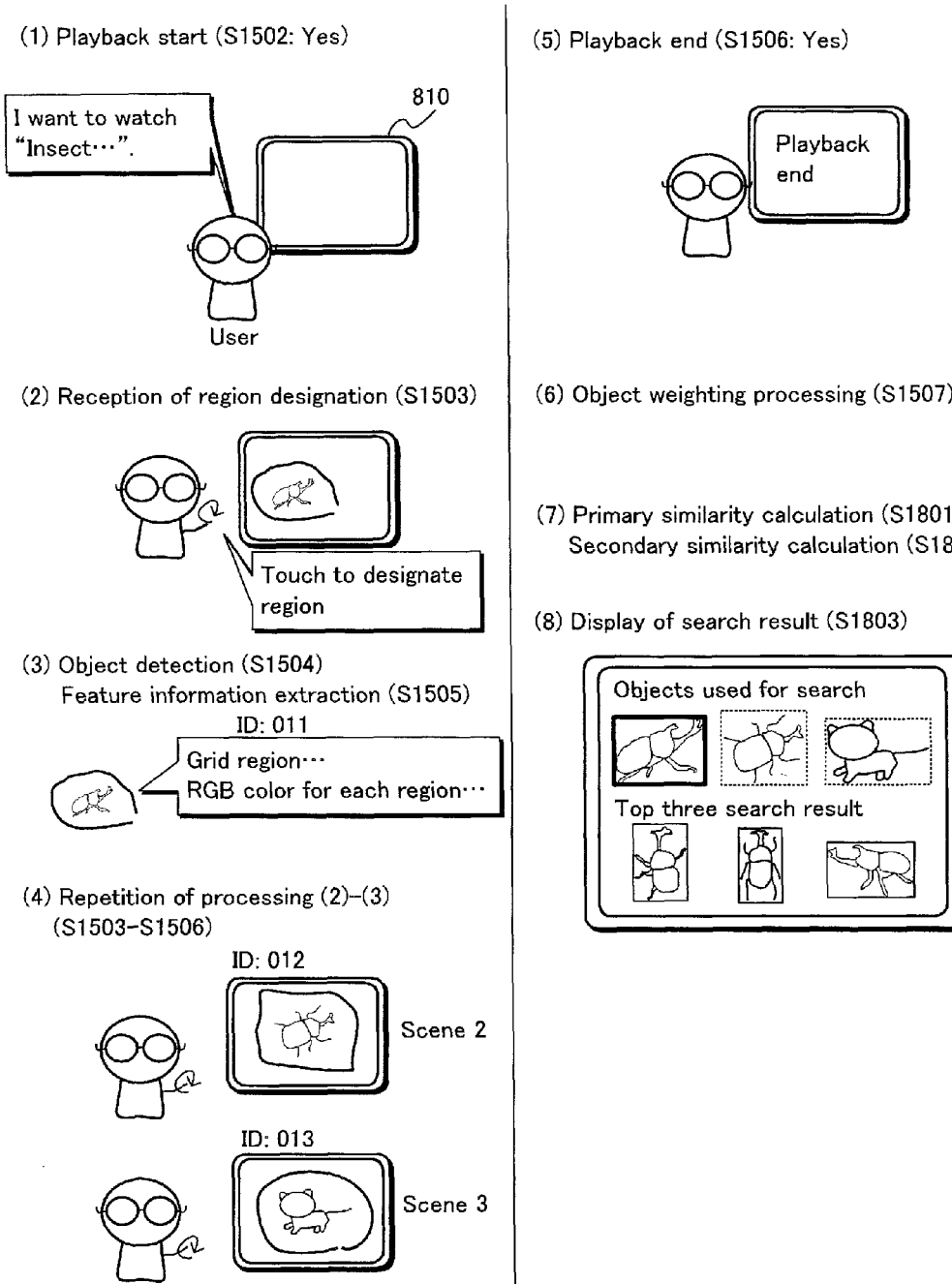
FIG. 27 shows a concept of an operation flow seen from the side of user interface.

FIG. 27 shows the concept of the above-described operation flow seen from the side of user interface.

According to the present embodiment as described above, the three objects (having respective object IDs "011", "012", and "013") are designated by the user via region designation. To each of the objects having the respective object IDs "011" and "012" that belong to the same scene having the scene number "2" among the designated three objects, a weight value is incremented by a value of "0.3". Then, a secondary similarity is calculated in consideration of a calculated primary similarity and the incremented weight value. As a result, with respect to each of the three designated objects, an object having a constant higher primary similarity, objects belonging to the same scene, and so on are finally determined to have a higher secondary similarity.

When a search is performed with use of a single designated object, an object is ranked higher in a result of the search because of happening to be similar just in color combination to the single designated object. For example, as shown in FIG. 20, when a search is performed with use of the object representing a beetle (having the object ID "011"), the object representing a tank (having the object ID "0003") is ranked higher in a result of the search. However, according to the present embodiment, it is possible to exclude, from a high rank in a search result, such an object, which is similar just in color combination to a single designated object. This improves the search accuracy.

In the example shown in FIG. 20, the number of objects that belong to the same scene having the scene number "2" is only two. However, as the number of objects for use in search increases to for example 10, 20, and more, it is more possible to reduce a probability that an object, which happens to be similar just in color combination to an object for use in search, is ranked higher in a search result.

<Supplementary Description 1>

Although the embodiment of the present invention has been described, the present invention is not limited to the above embodiment, and can be carried out in any embodiment for achieving the aim of the present invention and an aim relating to or following the present invention. The following may be employed, for example.

(1) The following supplements the description of a target frame from which an object is to be detected by the object detection unit 109.

The reception unit 108 receives designation of a region while a content is played back. Accordingly, frames pass by in a period between start of point input for region designation and the point input.

Figure 28:
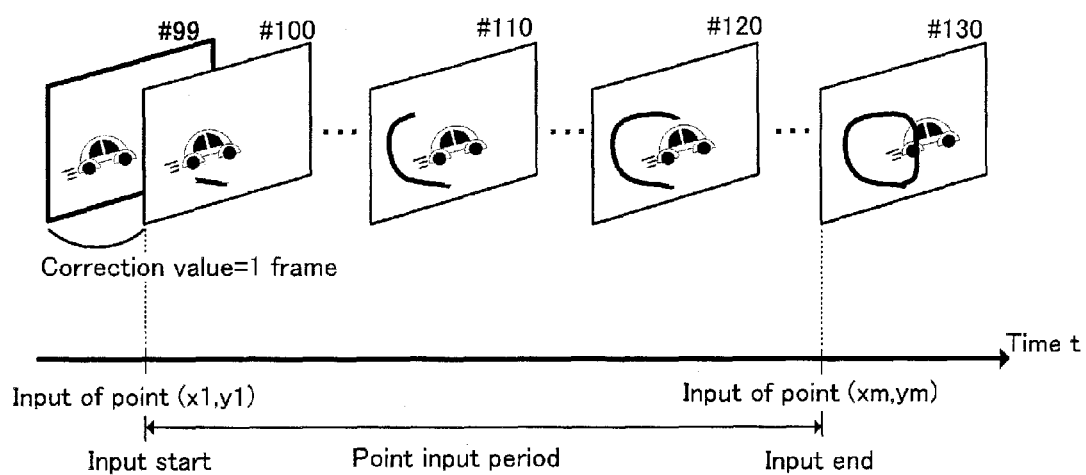
FIG. 28 shows transition in a point input period.

As a result, there is a case where while the user is inputting a point, a position of a desired object the user wants to designate moves, the desired object is beyond a frame, or the like, as shown in FIG. 28.

In consideration of this, it is preferable to detect an object from a frame having a frame number "#100" at the start of point input (a frame received firstly by the reception unit 108).

However, since the following delays (A) and/or (B) (having several milliseconds for example) might occur, a correction value δ in consideration these delays may be used for determining a target:

(A) delay necessitated by object designation via an input device that is distant from the video search device (such as a case where an object is designated by a Bluetooth connected mouse); and (B) delay necessitated by processing, display or the like performed by the touch screen 801.

In the example shown in FIG. 28, the correction value corresponds to one frame, and the object detection unit 109 detects an object from a frame having a frame number "#99", which is immediate precedent to the frame having the frame number "#100".

(2) In the above embodiment, object detection is performed based on a region designated by the user (see FIG. 8). However, the present invention is not limited to object detection based on such a region designation.

Figure 29:
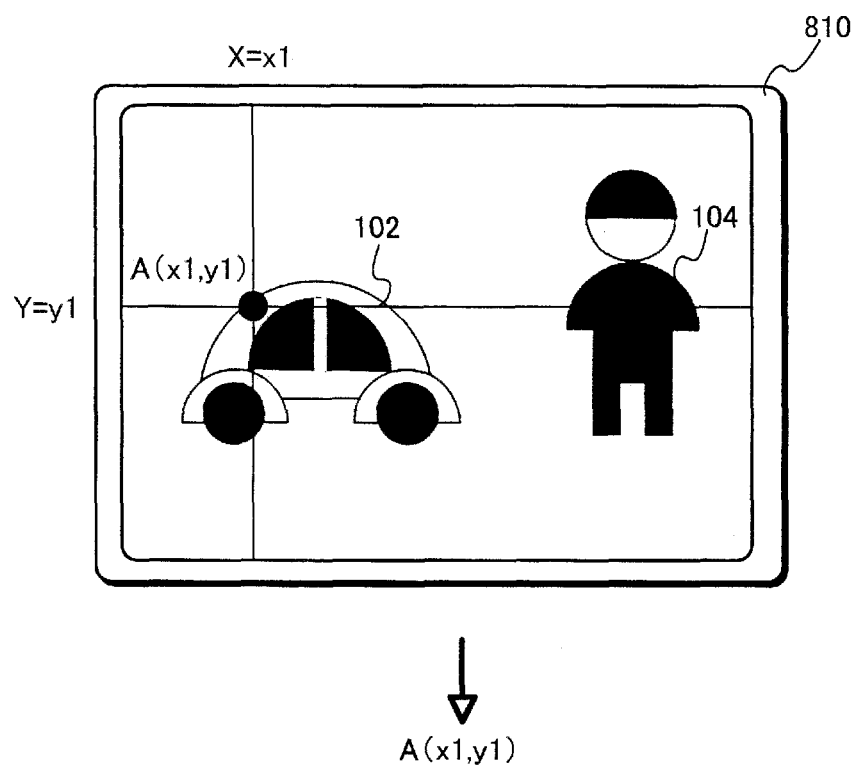
FIG. 29 shows point designation.

Alternatively, the following may be employed as shown in FIG. 29. For example, the reception unit 108 receives one point A (x1,y1) on the touch screen 801.

Figure 30:
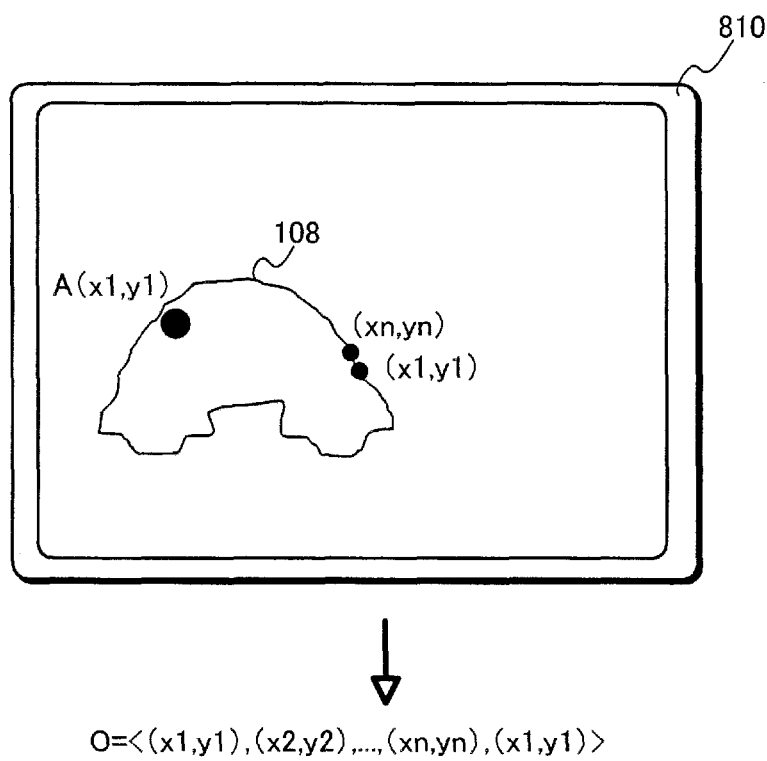
FIG. 30 shows object detection based on point designation.

Then, as shown in FIG. 30, the object detection unit 109 performs edge detection on a frame which is firstly received, thereby to detect an object 108 that contains the point A among objects via the edge detection.

Note that a general method may be employed for the above edge detection, such as the Canny edge detection (see the Non-Patent Literature 1).

In this way, object detection may be performed based on a point designated by the user (point designation).

Also, objection detection may be performed based on region designation or point designation based on the user's settings. Alternatively, if the number of points input in a fixed period t is equal to or less than c and a distance between each adjacent two of the input points is equal to or less than d, the object detection unit 109 judges to perform object detection based on point designation. Otherwise, the object detection unit 109 judges to perform object detection based on region designation.

(3) In the above embodiment, the link subunit 113 determines whether to make a link based on the sameness of scene to which each frame containing an object.

Figure 31:
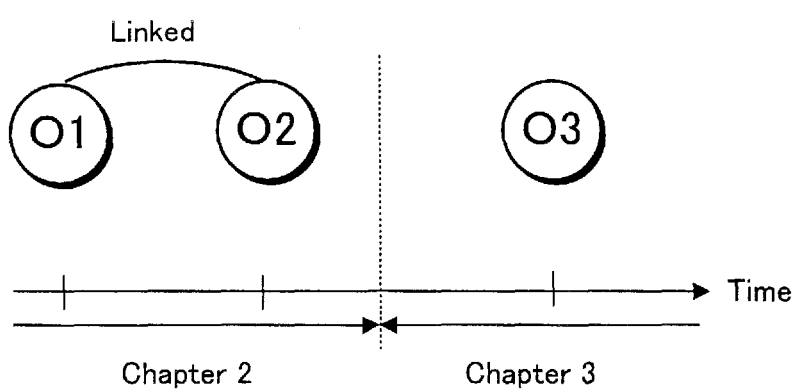
FIG. 31 describes link between objects.

Alternatively, as shown in FIG. 31, a link may be made between objects on condition that these objects belongs to the same chapter, for example.

Figure 32:
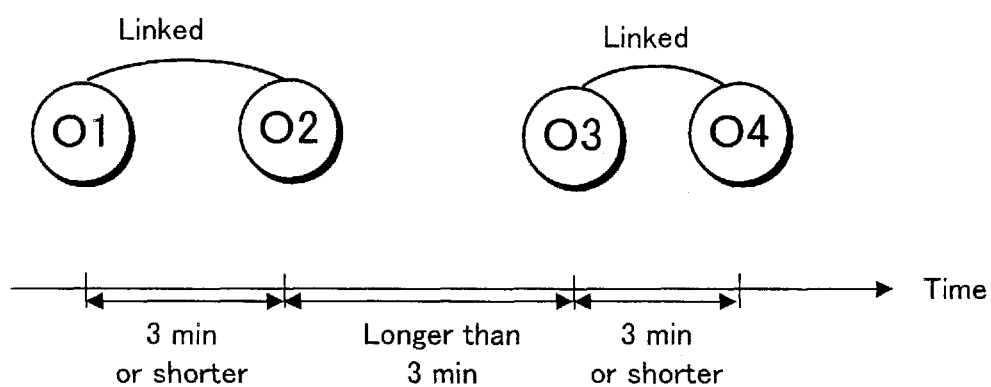
FIG. 32 describes link between objects.

Alternatively, as shown in FIG. 32, a link may be made between objects on condition that frames that contain the respective objects each have a playback period of a predetermined or shorter time length (such as three minutes or shorter).

Figure 33:
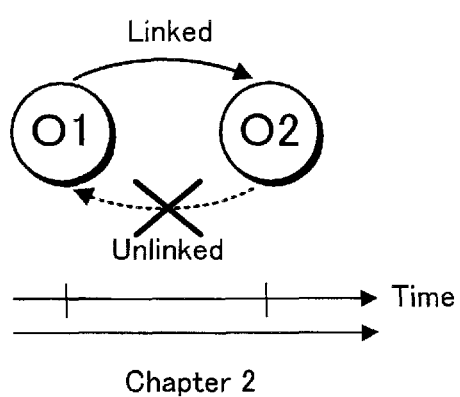
FIG. 33 describes link between objects.

Alternatively, as shown in FIG. 33, link may be unidirectionally made in consideration of the order of playback time of frames (the appearance order of objects). FIG. 33 shows an example where the object $O_1$ is linked to the object $O_2$, and the object $O_2$ is not linked to the object $O_1$.

Figure 34:
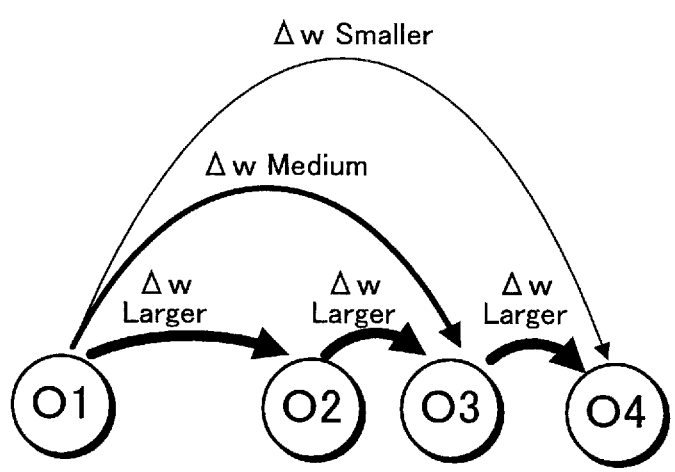
FIG. 34 describes link between objects.

Alternatively, as shown in FIG. 34, if the object $O_1$ is linked to the object $O_2$ and the object $O_2$ is linked to the object $O_3$ and the object $O_3$ is linked to the object $O_4$, the object $O_1$ may be recursively linked to the object $O_3$.

The link of the object $O_1$ to the object $O_3$ is indirect (that is, not direct). Accordingly, an increment Δw of a weight value to be assigned to the object $O_3$ is relatively smaller.

Furthermore, the link of the object $O_1$ to the object $O_4$ is more indirect than the link of the object $O_1$ to the object $O_3$. Accordingly, an increment Δw of weight value to be assigned to the object $O_4$ is further smaller than that in the above object $O_3$.

In this way, if the number of objects that mediate indirect link is smaller (recursion is shallower), the increment Δw of weight value may be set to be relatively larger. If the number of objects that mediate indirect link is larger (recursion is deeper), the increment Δw of weight value may be set to be relatively smaller.

Although FIG. 34 shows the example of unidirectional link, such a recursive link is also applicable to cross-link.

(4) In the above embodiment, the weight value increment subunit 114 increments a weight value of an object that has a linked object by a uniform value of "0.3". However, a method of incrementing a weight value of an object is not limited to this.

Alternatively, with respect to each object detected by the object detection unit 109, an appearance frequency in a content may be counted, for example. Specifically, the following may be employed. An item of "appearance frequency" is provided in a data row of the second buffer shown in FIG. 14. If an object has a higher appearance frequency, a weight value of the object is incremented by a value (such as a value of "0.5") larger than a value of "0.3". If an object has a lower appearance frequency, a weight value of the object is incremented by a value (such as a value of "0.1") smaller than a value of "0.3".

Alternatively, with respect to each object detected by the object detection unit 109, an appearance period in a content may be counted. Specifically, the following may be employed. An item of "appearance period" is provided in the data row of the second buffer shown in FIG. 14. If an object appears for a longer period, a weight value of the object is incremented by a value (such as a value of "0.5") larger than a value of "0.3". If an object appears for a shorter period, a weight value of the object is incremented by a value (such as a value of "0.1") smaller than a value of "0.3".

(5) The video search device may store therein a history indicating whether fast-forward, rewind, and so on have been performed in each frame, in correspondence with a frame number of the frame.

If a history indicates that a frame having a frame number "#2000" has been fast-forwarded for example, it may be possible to increment, by a smaller value, a weight value of an object having the object ID "011" (see FIG. 11) that is contained in the frame having the frame number "#2000". This is because that an object contained in a fast-forwarded frame is considered unimportant to the user.

On the contrary, it may be possible to increment, by a larger value, a weight value of an object contained in a rewound frame.

(6) The search unit 116 may search for an object in consideration of an appearance order of objects.

The following may be employed, for example. The object information storage unit 106 stores therein information indicating the appearance order of objects, calculates a higher secondary similarity with respect to each of objects detected by the object detection unit 109 whose appearance orders highly match the appearance orders of the objects indicated by the information.

(7) Objects detected by the object detection unit 109 may be accumulated as a database. The link subunit 113 may make a link to any of the accumulated objects.

Furthermore, in this case, together with the objects, information may be accumulated which indicates a name of series of contents containing frames containing the objects (such as a name of drama series and a name of movie series having sequels of parts 1, 2, 3, . . . ). Then, the link subunit 113 may make a link between objects which correspond to the same name of series.

(8) The larger size occupied by a linked object in a frame is (the larger size the linked object has), the higher weight value the weight value increment subunit 114 may increment to the linked object.

(9) The weight value assignment unit 111 adjusts a weight value to be assigned to an object, based on whether the object is linked by the link subunit 113. Alternatively, it may be possible to increment a weight value of each of objects that belong to the same scene, without making a link between these objects.

(10) The specific specifications and numerical values (such as an initial weight value and an increment value of a weight value) described in the embodiment and the above are just examples, and may be appropriately modified.

(11) The functional blocks such as shown in FIG. 1 each may be an LSI that is an integrated circuit. These functional blocks may be separately integrated into one chip, or integrated into one chip including part or all of the functional blocks. Although the LSI is used here, the LSI may be called an IC, a system LSI, a super LSI, and an ultra LSI, depending on the integration degree. A method of circuit integration is not limited to an LSI, but may be realized by a dedicated circuit or a general processor. Furthermore, it may be possible to use an FPGA (Field Programmable Gate Array) programmable after manufacturing LSIs or a reconfigurable processor in which connection and setting of a circuit cell inside an LSI can be reconfigured after manufacturing LSIs. Furthermore, if an integration technique that replaces LSIs emerges as a result of the advance of a semiconductor technique or a derivative technique, such a technique may of course be used to integrate functional blocks.

(12) A control program composed of a program code may cause a processor of various types of information processing devices, as well as various types of circuits connected to the processor, to perform the operations described in the above embodiment and so on. The control program may be recorded in a recording medium or distributed via various types of communication channels.

The above recording medium includes non-transitory recording medium such as an IC card, a hard disk, an optical disc, a flexible disk, a ROM, and the like.

The distributed control program is usable by being stored on, for example, a memory readable by a processor. The various types of functions described in the above embodiment are realized by the processor executing the control program.

<Supplementary Description 2>

The embodiment of the present invention includes the following aspects.

(1) The video search device relating to the present invention is a video search device comprising: a playback unit operable to play back a content composed of a plurality of frames; a reception unit operable to, while the playback unit plays back the content, receive, from a user, a plurality of inputs each specifying an object contained in a different one of the frames of the content; a detection unit operable to, each time the reception unit receives an input, detect an object specified by the received input; an assignment unit operable to assign, to each of the objects detected by the detection unit, a weight value adjusted based on a time-series feature of the frame containing the object; and a search unit operable to perform search based on the objects each having the weighted value assigned thereto.

(2) Also, the assignment unit may include: a link subunit operable to link two or more of the detected objects to each other, based on the time-series feature of each of the frames containing the respective two or more objects; and an increment subunit operable to increment the weight value of each of the two or more linked objects relative to the weight value of each of one or more of the detected objects that are not linked.

With this structure, the increment subunit performs relative increment of the weight values. This improves the search accuracy.

(3) Also, the content may be separated into a plurality of scenes on a playback time line thereof, and the link subunit may make the link between the two or more objects based on the sameness of scenes to which the frames containing the respective two or more objects belong.

With this structure, it is possible to assign an appropriate weight value to each object, based on a link made based on the sameness of scene.

(4) Also, the content may be separated into a plurality of chapters on a playback time line thereof, and the link subunit may make the link between the two or more objects based on the sameness of chapters to which the frames containing the respective two or more objects belong.

With this structure, it is possible to assign an appropriate weight value to each object, based on a link made based on the sameness of chapter.

(5) Also, the link subunit may make the link between one of the two or more objects and another one of the two or more objects that are indirectly linked to each other via yet another of the two or more objects.

(6) Also, the increment subunit may adjust an increment value of the weight value with respect to each of the indirectly linked objects, based on the number of objects that mediate the indirect link.

(7) Also, the link subunit may link one of the detected objects to another one of the detected objects contained in a frame whose playback time is preceded by a playback time of a frame containing the one object, and may not link the other one object to the one object.

With this structure, it is possible to assign an appropriate weight value to each object, by making a unidirectional link.

(8) The video search device may further comprise a storage unit operable to store therein a plurality of objects and feature information of each of the objects, wherein the detection unit may extract feature information of each of the detected objects, and the search unit may compare in feature information between each of the detected objects and each of the stored objects, thereby to search the stored objects for one or more objects similar to each of the detected objects.

(9) The video search device may further comprise a storage unit operable to store therein a plurality of objects and feature information of each of the objects, wherein the detection unit may extract feature information of each of the detected objects, the assignment unit may assign a weight value to each of the stored objects, and with respect to each of the detected objects, the search unit may (i) compare feature information between the detected object and each of the stored objects, thereby to calculate a primary similarity between the detected object and each of the stored objects, and (ii) add a product of the primary similarity and the weight value of the detected object to a product of a primary similarity between an object that is linked to the detected object and each of the stored objects and a weight value of the linked object, thereby to calculate a secondary similarity between the detected object and each of the stored objects.

(10) The video search device may further comprise a frequency count unit operable to count an appearance frequency with respect to each of the linked objects in the content, wherein the increment unit may increment the weight value of each of the linked objects in proportion to a counted appearance frequency of the linked object.

(11) Also, The video search device may further comprise a time count unit operable to count an appearance length on the playback time line of the content with respect to each of the linked objects, wherein the increment unit may increment the weight value of each of the linked objects in proportion to a counted appearance length of the linked object.

(12) Also, the increment unit may increment the weight value of each of the linked objects in proportion to a size of the frame containing the linked object.

(13) The video search device may further comprise a history storage unit operable to store therein information specifying a frame that has been fast-forwarded or rewound by the playback unit, wherein the increment unit may refer to the information stored in the history storage unit, if a frame specified by the information to have been fast-forwarded contains any of the linked objects, the increment unit may increment the weight value of the any linked object by a smaller value, and if a frame specified by the information to have been rewound contains any of the linked objects, the increment unit may increment the weight value of the any linked object by a larger value.

(14) The video search device may further comprise a storage unit operable to store therein a plurality of objects and an appearance order of each of the objects on a playback time line of a content composed of frames containing the objects, wherein the detection unit may specify appearance orders of the detected objects on the playback time line of the content, and the search unit may search the objects stored in the storage unit for objects whose appearance orders closely match the specified appearance orders of the detected objects.

(15) The video search device may further comprise an accumulation unit operable to accumulate therein a plurality of objects detected by the detection unit and weighted values assigned thereto in one-to-one association, wherein the link subunit may make the link to any of the objects accumulated in the accumulation unit.

(16) The accumulation unit may accumulate therein, with respect to each of the accumulated objects, series identification information, a plurality of objects detected by the detection unit may be each associated with information indicating a series name of a content of a frame containing the detected object, and the link subunit may refer to the accumulated objects, and make a link between each of the detected objects and any of the accumulated objects that match in a series name.

(17) The video search method relating to the present invention is a video search method comprising: a playback step of playing back a content composed of a plurality of frames; a reception step of, while the content is played back in the playback step, receiving, from a user, a plurality of inputs each specifying an object contained in a different one of the frames of the content; a detection step of, each time an input is received in the reception step, detecting an object specified in the received input; an assignment step of assigning, to each of the objects detected in the detection step, a weight value adjusted based on a time-series feature of the frame containing the object; and a search step of performing search based on the objects each having the weighted value assigned thereto.

(18) The program relating to the present invention is a program for causing a computer to execute a video searching processing, the video searching processing comprising: a playback step of playing back a content composed of a plurality of frames; a reception step of, while the content is played back in the playback step, receiving, from a user, a plurality of inputs each specifying an object contained in a different one of the frames of the content; a detection step of, each time an input is received in the reception step, detecting an object specified in the received input; an assignment step of assigning, to each of the objects detected in the detection step, a weight value adjusted based on a time-series feature of the frame containing the object; and a search step of performing search based on the objects each having the weighted value assigned thereto.

(19) The integrated circuit relating to the present invention is an integrated circuit comprising: a playback unit operable to play back a content composed of a plurality of frames; a reception unit operable to, while the playback unit plays back the content, receive, from a user, a plurality of inputs each specifying an object contained in a different one of the frames of the content; a detection unit operable to, each time the reception unit receives an input, detect an object specified by the received input; an assignment unit operable to assign, to each of the objects detected by the detection unit, a weight value adjusted based on a time-series feature of the frame containing the object; and a search unit operable to perform search based on the objects each having the weighted value assigned thereto.

INDUSTRIAL APPLICABILITY

The video search device relating to the present invention is useful because of its contribution to the improvement of search accuracy.

REFERENCE SIGNS LIST 101 video search device
102 communication unit
103 content storage unit
104 content management information storage unit
105 scene information storage unit
106 object information storage unit
107 playback unit
108 reception unit
109 object detection unit
110 first buffer
111 weight value assignment unit
112 initial weight value assignment subunit
113 link subunit
114 weight value increment subunit
115 second buffer
116 search unit
117 display control unit
118 display unit
801 touch screen

The invention claimed is:

1. A video search device comprising:
a playback unit operable to play back a content composed of a plurality of frames;
a reception unit operable to, while the playback unit plays back the content, receive, from a user, a plurality of inputs each specifying an object contained in a different one of the frames of the content;
a detection unit operable to, each time the reception unit receives an input, detect an object specified by the received input;
an assignment unit operable to assign, to each of the objects detected by the detection unit, a weight value adjusted based on a time-series feature of the frame containing the object and indicating an importance of the object among the objects; and
a search unit operable to perform search for an object using the objects, which are contained in the frames of the content and specified by the plurality of inputs received from the user, based on the objects each having the weighted value assigned thereto, wherein
the assignment unit includes:
a link subunit operable to link two or more of the detected objects to each other, based on the time-series feature of each of the frames containing the respective two or more objects; and
an increment subunit operable to increment the weight value of each of the two or more linked objects relative to the weight value of each of one or more of the detected objects that are not linked,
the video search device further comprises a storage unit operable to store therein a plurality of objects and feature information of each of the objects,
the detection unit extracts feature information of each of the detected objects,
the assignment unit assigns a weight value to each of the stored objects, and
with respect to each of the detected objects, the search unit (i) compares feature information between the detected object and each of the stored objects, thereby to calculate a primary similarity between the detected object and each of the stored objects, and (ii) adds a product of the primary similarity and the weight value of the detected object to a product of a primary similarity between an object that is linked to the detected object and each of the stored objects and a weight value of the linked object, thereby to calculate a secondary similarity between the detected object and each of the stored objects.

2. The video search device of claim 1, wherein
the content is separated into a plurality of scenes on a playback time line thereof, and
the link subunit makes the link between the two or more objects based on the sameness of scenes to which the frames containing the respective two or more objects belong.

3. The video search device of claim 1, wherein
the content is separated into a plurality of chapters on a playback time line thereof, and
the link subunit makes the link between the two or more objects based on the sameness of chapters to which the frames containing the respective two or more objects belong.

4. The video search device of claim 1, wherein
the link subunit makes the link between one of the two or more objects and another one of the two or more objects that are indirectly linked to each other via yet another of the two or more objects.

5. The video search device of claim 4, wherein
the increment subunit adjusts an increment value of the weight value with respect to each of the indirectly linked objects, based on the number of objects that mediate the indirect link.

6. The video search device of claim 1, wherein
the link subunit links one of the detected objects to another one of the detected objects contained in a frame whose playback time is preceded by a playback time of a frame containing the one object, and does not link the other one object to the one object.

7. The video search device of claim 1, further comprising a frequency count unit operable to count an appearance frequency with respect to each of the linked objects in the content, wherein
the increment unit increments the weight value of each of the linked objects in proportion to a counted appearance frequency of the linked object.

8. The video search device of claim 1, further comprising a time count unit operable to count an appearance length on the playback time line of the content with respect to each of the linked objects, wherein
the increment unit increments the weight value of each of the linked objects in proportion to a counted appearance length of the linked object.

9. The video search device of claim 1, wherein
the increment unit increments the weight value of each of the linked objects in proportion to a size of the frame containing the linked object.

10. The video search device of claim 1, further comprising an accumulation unit operable to accumulate therein a plurality of objects detected by the detection unit and weighted values assigned thereto in one-to-one association, wherein
the link subunit makes the link to any of the objects accumulated in the accumulation unit.

11. The video search device of claim 10, wherein
the accumulation unit accumulates therein, with respect to each of the accumulated objects, series identification information,
a plurality of objects detected by the detection unit are each associated with information indicating a series name of a content of a frame containing the detected object, and
the link subunit refers to the accumulated objects, and makes a link between each of the detected objects and any of the accumulated objects that match in a series name.

12. A video search device comprising:
a playback unit operable to play back a content composed of a plurality of frames;
a reception unit operable to, while the playback unit plays back the content, receive, from a user, a plurality of inputs each specifying an object contained in a different one of the frames of the content;
a detection unit operable to, each time the reception unit receives an input, detect an object specified by the received input;
an assignment unit operable to assign, to each of the objects detected by the detection unit, a weight value adjusted based on a time-series feature of the frame containing the object and indicating an importance of the object among the objects; and
a search unit operable to perform search for an object using the objects, which are contained in the frames of the content and specified by the plurality of inputs received from the user, based on the objects each having the weighted value assigned thereto, wherein
the assignment unit includes:
  a link subunit operable to link two or more of the detected objects to each other, based on the time-series feature of each of the frames containing the respective two or more objects; and
  an increment subunit operable to increment the weight value of each of the two or more linked objects relative to the weight value of each of one or more of the detected objects that are not linked,
the video search device further comprises a history storage unit operable to store therein information specifying a frame that has been fast-forwarded or rewound by the playback unit, and
the increment unit refers to the information stored in the history storage unit,
  if a frame specified by the information to have been fast-forwarded contains any of the linked objects, the increment unit increments the weight value of the any linked object by a smaller value, and
  if a frame specified by the information to have been rewound contains any of the linked objects, the increment unit increments the weight value of the any linked object by a larger value.

13. A video search method comprising:
a playback step of playing back a content composed of a plurality of frames;
a reception step of, while the content is played back in the playback step, receiving, from a user, a plurality of inputs each specifying an object contained in a different one of the frames of the content;
a detection step of, each time an input is received in the reception step, detecting an object specified in the received input;
an assignment step of assigning, to each of the objects detected in the detection step, a weight value adjusted based on a time-series feature of the frame containing the object and indicating an importance of the object among the objects; and
a search step of performing search for an object using the objects, which are contained in the frames of the content and specified by the plurality of inputs received from the user, based on the objects each having the weighted value assigned thereto, wherein
the assignment step includes:
  a link step of linking two or more of the detected objects to each other, based on the time-series feature of each of the frames containing the respective two or more objects; and
  an increment step of incrementing the weight value of each of the two or more linked objects relative to the weight value of each of one or more of the detected objects that are not linked,
the video search method further comprises a storage step of storing operable to store, in a storage unit, a plurality of objects and feature information of each of the objects,
the detection step includes extracting feature information of each of the detected objects,
the assignment step includes assigning a weight value to each of the stored objects, and
with respect to each of the detected objects, the search step includes (i) comparing feature information between the detected object and each of the stored objects, thereby to calculate a primary similarity between the detected object and each of the stored objects, and (ii) adding product of the primary similarity and the weight value of the detected object to a product of a primary similarity between an object that is linked to the detected object and each of the stored objects and a weight value of the linked object, thereby to calculate a secondary similarity between the detected object and each of the stored objects.

14. A non-transitory computer readable recording medium having stored thereon a program for causing a computer to execute a video search method, the video search method comprising:
a playback step of playing back a content composed of a plurality of frames;
a reception step of, while the content is played back in the playback step, receiving, from a user, a plurality of inputs each specifying an object contained in a different one of the frames of the content;
a detection step of, each time an input is received in the reception step, detecting an object specified in the received input;
an assignment step of assigning, to each of the objects detected in the detection step, a weight value adjusted based on a time-series feature of the frame containing the object and indicating an importance of the object among the objects; and
a search step of performing search for an object using the objects, which are contained in the frames of the content and specified by the plurality of inputs received from the user, based on the objects each having the weighted value assigned thereto, wherein the assignment step includes:

a link step of linking two or more of the detected objects to each other, based on the time-series feature of each of the frames containing the respective two or more objects; and an increment step of incrementing the weight value of each of the two or more linked objects relative to the weight value of each of one or more of the detected objects that are not linked, the video search method further comprises a storage step of storing operable to store, in a storage unit, a plurality of objects and feature information of each of the objects, the detection step includes extracting feature information of each of the detected objects, the assignment step includes assigning a weight value to each of the stored objects, and with respect to each of the detected objects, the search step includes (i) comparing feature information between the detected object and each of the stored objects, thereby to calculate a primary similarity between the detected object and each of the stored objects, and (ii) adding product of the primary similarity and the weight value of the detected object to a product of a primary similarity between an object that is linked to the detected object and each of the stored objects and a weight value of the linked object, thereby to calculate a secondary similarity between the detected object and each of the stored objects.

15. An integrated circuit comprising:

a playback unit operable to play back a content composed of a plurality of frames;

a reception unit operable to, while the playback unit plays back the content, receive, from a user, a plurality of inputs each specifying an object contained in a different one of the frames of the content;

a detection unit operable to, each time the reception unit receives an input, detect an object specified by the received input;

an assignment unit operable to assign, to each of the objects detected by the detection unit, a weight value adjusted based on a time-series feature of the frame containing the object and indicating an importance of the object among the objects; and a search unit operable to perform search for an object using the objects, which are contained in the frames of the content and specified by the plurality of inputs received from the user, based on the objects each having the weighted value assigned thereto, wherein the assignment unit includes:

a link subunit operable to link two or more of the detected objects to each other, based on the time-series feature of each of the frames containing the respective two or more objects; and an increment subunit operable to increment the weight value of each of the two or more linked objects relative to the weight value of each of one or more of the detected objects that are not linked, the integrated circuit further comprises a storage unit operable to store therein a plurality of objects and feature information of each of the objects, the detection unit extracts feature information of each of the detected objects, the assignment unit assigns a weight value to each of the stored objects, and with respect to each of the detected objects, the search unit (i) compares feature information between the detected object and each of the stored objects, thereby to calculate a primary similarity between the detected object and each of the stored objects, and (ii) adds a product of the primary similarity and the weight value of the detected object to a product of a primary similarity between an object that is linked to the detected object and each of the stored objects and a weight value of the linked object, thereby to calculate a secondary similarity between the detected object and each of the stored objects.

\* \* \* \* \*